United States Patent
Kobayashi et al.

(10) Patent No.: US 6,988,120 B2
(45) Date of Patent: Jan. 17, 2006

(54) ARITHMETIC UNIT AND METHOD THEREOF

(75) Inventors: Yoshinao Kobayashi, Hiratsuka (JP); Ken Namura, Sagamihara (JP); Kenya Katoh, Machida (JP)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 10/162,812

(22) Filed: Jun. 4, 2002

(65) Prior Publication Data
US 2003/0126177 A1    Jul. 3, 2003

(30) Foreign Application Priority Data
Jun. 4, 2001    (JP)    ............................. 2001-168737

(51) Int. Cl.
*G06F 7/552*    (2006.01)
(52) U.S. Cl. ............... 708/606; 708/497; 708/503; 708/551
(58) Field of Classification Search ............... 708/606, 708/625, 551, 497, 503
See application file for complete search history.

(56) References Cited

U.S. PATENT DOCUMENTS

| | | | | |
|---|---|---|---|---|
| RE35,365 E | * | 10/1996 | Colavin | 708/606 |
| 6,018,758 A | * | 1/2000 | Griesbach et al. | 708/606 |
| 6,301,598 B1 | * | 10/2001 | Dierke et al. | 708/606 |
| 6,393,453 B1 | * | 5/2002 | Purcell | 708/606 |
| 6,766,346 B2 | * | 7/2004 | Amer | 708/606 |
| 2001/0018699 A1 | * | 8/2001 | Amer | 708/606 |

* cited by examiner

*Primary Examiner*—D. H. Malzahn
(74) *Attorney, Agent, or Firm*—Douglas W. Cameron

(57) ABSTRACT

A squaring multiplier for a floating-point number comprises: a pseudo carry generator for generating pseudo information concerning a carry equivalent to predetermined bits for the calculation of a target variable; an MSB look ahead circuit for employing the variable to perform a look ahead operation and establish the location of the MSB (Most Significant Bit) in the calculation results; and combinational circuits for performing the rounding off process and the calculation of the variables by using information concerning a carry, which is generated by the pseudo carry generator and based on the location of the MSB determined by the MSB look ahead circuit.

17 Claims, 8 Drawing Sheets

ARITHMETIC UNIT AND METHOD THEREOF

FIELD OF THE INVENTION

The present invention relates to an arithmetic unit used for the processor of a computer, and in particular to the configuration of an arithmetic unit that performs calculations for squaring floating-point numbers and an arithmetic method therefor.

BACKGROUND ART

The squaring for scientific engineering calculations of values expressed as floating-point numbers is frequently performed using a computer, and the capability of a computer to perform the required calculations is greatly affected by the processing speed of the multiplier provided for the squaring of the floating-point numbers. For this reason, various devices have been devised to improve the processing speeds of multipliers used for squaring floating-point numbers.

An explanation will now be given for the square calculation of a floating-point number using an electronic circuit and a conventional method employed for improving calculation speed.

For the multiplication of a floating-point number, two processes are required: the multiplication of numerical values, and the rounding off of the product that is performed. Usually, the multiplication of numerical values is the process used for conventional devices designed to speed up squaring calculations performed for floating-point numbers.

First, an explanation will be given for the multiplication of eight-bit numbers represented by a ($=a7, a6, a5, a4, a3, a2, a1$ and $a0$) and b ($=b7, b6, b5, b4, b3, b2, b1$ and $b0$).

Figures 6, 7:
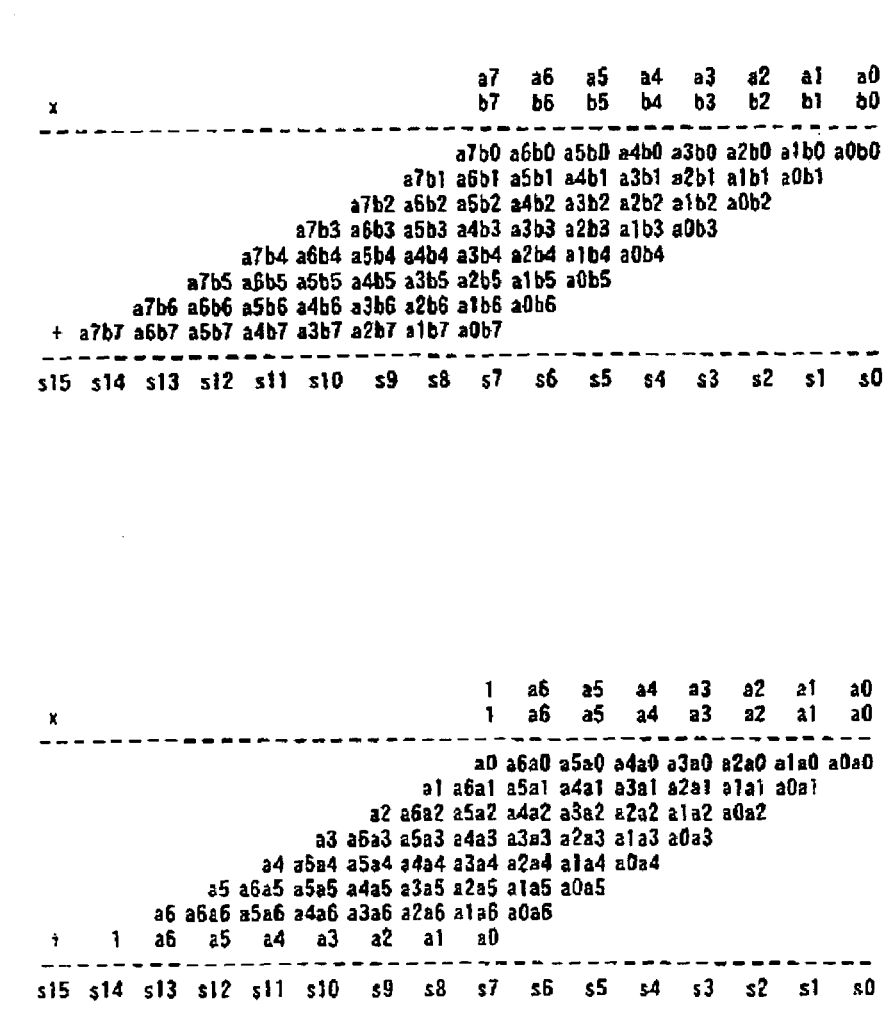

FIG. 6 is a diagram for explaining the multiplication of the numbers a and b. As is shown in FIG. 6, when a and b are multiplied, first, 64 ($=8\times 8$) product terms of $a0b0$ to $a7b7$ are generated for the individual bits of these numbers, and are sequentially added together. A multiplier for performing this calculation is constituted as an established method for a circuit technique by using a Wallace tree and a binary adder.

For a squaring calculation, two like numbers are multiplied, and when floating-point numbers are multiplied, the most significant bit (MSB) is always "1". Therefore, the squaring multiplication of the number a, consisting of eight, eight bit numbers, in FIG. 6 is performed as is shown in FIG. 7, where $b=a$ and $a7=1$. For the product terms in FIG. 7, $$a_i a_i = a_i \qquad (a)$$

$$a_i a_j = a_j a_i \qquad (b)$$

are established.

In equation (a), since like terms are multiplied, an AND gate is not required.

In equation (b), since the product term $a_i a_j$ corresponds to the product term $a_j a_i$, it is therefore found that when these two product terms are added at the same position, they need only be collated to form a single product term in order to be inserted in a one level higher position.

Conventionally, there is a well known method for whereby a Wallace tree can be simplified by using the symmetry of the product terms in a squaring multiplier. FIG. 8 is a diagram showing the state wherein the Wallace tree is simplified by using the symmetry of the product terms used for the squaring calculation in FIG. 7 to reduce the number of product terms.

In FIG. 8, for example, since the product term at position s0 is only $a0a0$, equation (a) can be applied for this product term, and therefore, a0 is entered unchanged at position s0.

Then, since the product terms at position s1 are $a1a0$ and $a0a1$, equation (b) can be applied for these product terms, and therefore, the product term $a1a0$, obtained by collating the above product terms, is carried over and entered at one higher position, s2.

At position s2, there are three product terms, $a2a0$, $a1a1$ and $a0a2$. For these product terms, equation (a) can be applied for product term $a1a1$, and equation (b) can be applied for product terms $a2a0$ and $a0a2$. Therefore, at position s2, by applying equation (a) for $a1a1$, a1 is entered, and $a2a0$, obtained by applying equation (b) for the terms $a2a0$ and $a0a2$, is carried over and entered at position s3.

As a result, the 64 product terms in FIG. 7 are reduced to 36. And since the number of product terms is reduced, accordingly, the number of arithmetic units constituting the squaring multiplier and the circuit size are also reduced. Thus, the accumulated processing delay is decreased and the processing speed of the squaring multiplier is increased.

For a binary adder for calculating the above product terms, a circuit technique, called a Carry Look Ahead (CLA), is available that uses a combinational circuit to generate a higher carry from a lower carry. This Carry Look Ahead circuit technique can reduce the delay resulting from the addition process performed by the adder.

Furthermore, as is described above, since when floating-point numbers are multiplied the number of effective input bits equals the number of effective output bits, a rounding off process is performed for the addition results obtained for the numerical values.

FIG. 9 is a flowchart for explaining the multiplication processing, including the rounding off process.

In FIG. 9, during the multiplication of floating-point numbers, first, addition is performed using the above method (step 901), and based on the results, the location of the MSB of the mantissa is established (step 902). Then, based on the location of the MSB, the location of a guard bit is established (step 903), and a round-off bit, a target for the rounding off process, is established (step 904). Thereafter, the rounding off process is actually performed for the round-off bit that is obtained a result of the addition performed at step 901 (step 905). When a carry is generated as a result of the rounding off process, a "1" is added to the value of the exponential portion (step 906).

The above described calculation method and rounding off method used for floating-point numbers conform to standard IEEE (Institute of Electrical and Electronics Engineers) 754.

As is described above, various devices have been provided for increasing the processing speed of squaring multipliers for floating-point numbers. But even so, currently, in line with requests that the processing capabilities of computers be improved, even greater increases are being sought for squaring multipliers for floating-point numbers.

It is, therefore, one object of the present invention to provide a squaring multiplier for floating-point numbers for which the number of constituent arithmetic units is reduced by locally compressing the addition of the floating-point numbers (the addition of mantissas), and to provide increased processing speeds.

It is another object of the present invention to increase the processing speeds of squaring multipliers for floating-point numbers by performing in parallel the addition of floating-point numbers and the rounding off process performed for the addition results.

SUMMARY OF THE INVENTION

To achieve the above objects, a processor comprises: a register, for holding a predetermined binary variable; and an arithmetic unit, for reading a target variable from the register and for performing various arithmetic operations for the target variable, wherein the arithmetic unit includes a pseudo carry generator, for generating pseudo information concerning a carry in a number equivalent to the predetermined bit count in an arithmetic operation for the target variable, and a combinational circuit, for performing an arithmetic operation for the target variable by using the pseudo information concerning a carry that is generated by the pseudo carry generator.

The pseudo generation of information concerning a carry does not mean that a carry is obtained as a result of the actual numerical calculation, but means only that a look ahead operation is performed and a carry is generated by using the combinational circuit (pseudo carry generator).

For a target bit for a rounding off process during an arithmetic operation, the pseudo carry generator generates the pseudo information concerning a carry.

According to the present invention, a processor comprises: a register, for holding a predetermined binary variable; and an arithmetic unit, for reading a target variable from the register and for performing various arithmetic operations for the target variable, wherein the arithmetic unit includes a pseudo carry generator, for performing look ahead operations for generating carries in a number equivalent to a predetermined bit count in an arithmetic operation performed for the target variable, and a combinational circuit for using the results obtained by the pseudo carry generator to perform an arithmetic operation for the target variable.

According to the present invention, a processor comprises: a register, for holding a predetermined binary variable; and an arithmetic unit, for reading a target variable from the register and for performing various arithmetic operations for the target variable, wherein the arithmetic unit includes a pseudo carry generator, for generating information concerning a carry when a numerical value is calculated for a value equivalent in number to the lower predetermined bit count for the target variable, and a combinational circuit, for calculating a value for a higher bit while taking into account the information concerning the carry.

According to the present invention, a processor comprises: a register, for holding a predetermined binary variable; and an arithmetic unit, for reading a target variable from the register and for performing various arithmetic operations for the target variable, wherein the arithmetic unit includes a first combinational circuit, for obtaining, directly from a target variable, information concerning the location of a round-off bit that is used for a rounding off process performed in conjunction with an arithmetic operation performed for a variable, and a second combinational circuit, for performing the arithmetic operation for the target variable while performing the rounding off process using the information concerning the location of the round-off bit that is obtained by the first combinational circuit.

More specifically, the second combinational circuit performs the arithmetic operation beginning with the lowest digit of the target variable. Further, when the second combinational circuit obtains, from the first combinational circuit, the information concerning the location of the round-off bit, and progresses the calculation up to the location of the round-off bit, the second combinational circuit establishes the value of the round-off bit, and performs the calculation for a higher digit while taking into account the value of the round-off bit.

According to the present invention, a processor comprises: a register, for holding a predetermined binary variable; and an arithmetic unit, for reading a target variable from the register and for performing various arithmetic operations for the target variable, wherein the arithmetic unit includes an MSB look ahead circuit, for employing the target variable to establish, in a look ahead manner, the location of the most significant bit (MSB) of the operation results, and a combinational circuit, for performing a rounding off process based on the location of the most significant bit established by the MSB look ahead circuit.

According to the present invention, a processor comprises: a register, for holding a predetermined binary variable; and an arithmetic unit, for reading a target variable from the register and for performing squaring calculation for the target variable, wherein the arithmetic unit includes an MSB look ahead circuit, for comparing the target variable with the $\sqrt{2}$ and for employing the comparison results to establish the location of the most significant bit (MSB) of the results obtained for the operation, and a combinational circuit, for performing a rounding off process based on the location of the most significant bit that is established by the MSB look ahead circuit.

According to the present invention, an arithmetic unit that multiplies predetermined binary floating-point numbers comprises: means for reading a target floating-point number from a register for holding floating-point numbers; means for generating information concerning a carry, equivalent in number to a predetermined bit count, for the target floating-point number; and means for adding the mantissa of the target floating-point number while taking into account the information concerning a carry.

The means for generating the information concerning a carry generates information concerning a carry for a value equivalent in number to a predetermined lower bit count in the mantissa of the target floating-point number. The means for performing the addition adds the higher bits of the mantissa while taking into account the information concerning a carry.

According to the present invention, an arithmetic unit that multiples predetermined binary floating-point numbers comprises: means for reading a target floating-point number from a register for holding floating-point numbers; means for performing carry look ahead operations in a number equivalent to a predetermined bit count during the multiplication of the target floating-point number; and means for multiplying the target floating-point number by using the results obtained by the carry look ahead operations.

According to the invention, an arithmetic unit that multiplies predetermined binary floating-point numbers comprises: means for reading a target floating-point number from a register for holding floating-point numbers; means for obtaining, directly from the target floating-point number, information that is used for a rounding off process performed in conjunction with the multiplication of the target floating-point number; and means for adding a mantissa of the target floating-point number while performing the rounding off process using the thus obtained information.

According to the present invention, an arithmetic unit that multiplies predetermined binary floating-point numbers comprises: means for reading a target floating-point number from a register for holding floating-point numbers; and means for obtaining, directly from the mantissa of the target floating-point number, the location of the most significant bit (MSB) of the multiplication results obtained for the target floating-point number.

According to the invention, an arithmetic unit that performs squaring calculations for predetermined binary floating-point numbers comprises: means for reading a target floating-point number from a register for holding floating-point numbers; and means for comparing the mantissa of the target floating-point number with the 2, and for, based on the comparison results, establishing the location of the most significant bit (MSB) of the operation results.

According to the invention, an arithmetic method, for an arithmetic unit that multiplies predetermined binary floating-point numbers, comprises the steps of: reading the target floating-point numbers from registers for holding floating-point numbers; generating, for a value equivalent in number to the predetermined lower bit count for the mantissas of the target floating-point numbers, information concerning a carry generated when a numerical value is calculated; and calculating the value of a higher bit while taking into account the information concerning the carry.

According to the present invention, an arithmetic method, for an arithmetic unit that multiplies predetermined binary floating-point numbers, comprises the steps of: reading target floating-point numbers from registers for holding floating-point numbers; calculating mantissas for the target floating-point numbers beginning with the lowest digits, and detecting the location of a round-off bit that is used for a rounding off process; establishing the value of the round-off bit when the calculation progresses are completed up to the location of the round-off bit; and calculating a higher digit while taking into account the value of the round-off bit.

BRIEF DESCRIPTION OF THE DRAWINGS

FIG. 3 is a diagram for explaining a squaring calculation operation using the pseudo carry according to the embodiment.

FIG. 4 is a diagram for explaining a specific calculation example for a rounding off process.

FIG. 6 is a diagram for explaining the multiplication of two eight bit variables.

FIG. 7 is a diagram for explaining an 8×8 bit squaring calculation.

FIG. 8 is a diagram showing a case wherein a Wallace tree is simplified and the number of terms is reduced by using the symmetry of product terms for the squaring multiplication in FIG. 7.

DETAILED DESCRIPTION OF THE PREFERRED EMBODIMENTS

The preferred embodiment of the present invention will now be described in detail while referring to the accompanying drawings.

In this invention, to increase the processing speed of a squaring multiplier for floating-point numbers, the following two methods are proposed:
performing a carry look ahead operation while the lower bits of a floating-point number are added; and
looking ahead and establishing the value of the MSB in the addition results obtained for the floating-point numbers in order to perform the rounding off of the addition results in parallel with the addition of the lower bits.

In this embodiment, an arithmetic unit is provided that includes combinational circuits (a pseudo carry generator and an MSB look ahead circuit, which will be described later) that implement these methods.

Figure 1:
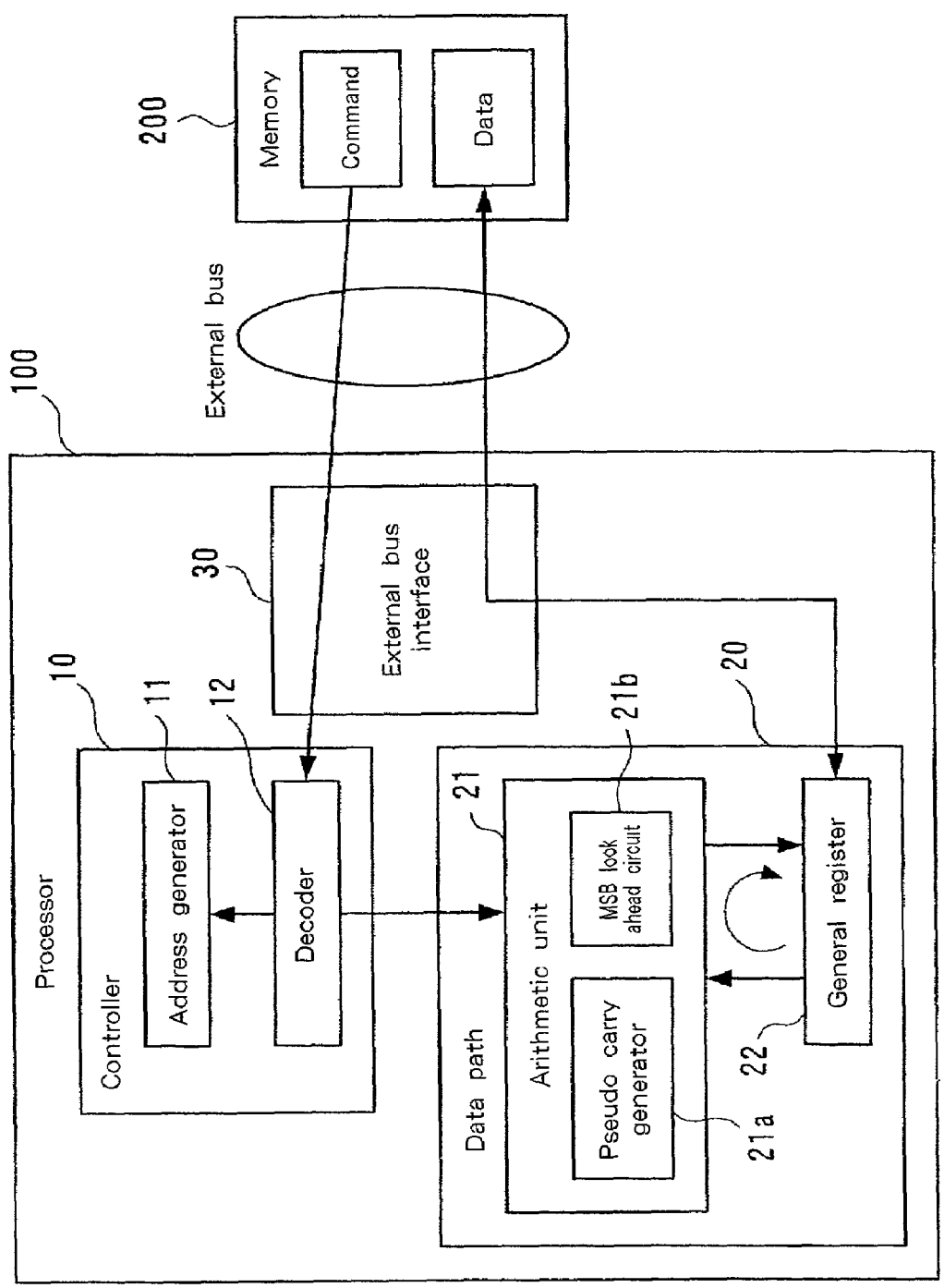
FIG. 1 is a diagram showing the configuration of a processor for which an arithmetic unit according to one embodiment of the present invention is employed.

FIG. 1 is a diagram showing an example configuration for a processor that employs the arithmetic unit of the invention. In FIG. 1, a processor 100 comprises: a controller 10, including an address generator 11 and a decoder 12; a data path unit 20, including an arithmetic unit 21 and a general register 22; and an external bus interface 30, for accessing a memory 200. In the processor 100, first, the decoder 12 of the controller 10 receives a command, via the external bus interface 30, for a process developed in the memory 200, and then it decodes the command and transmits the decoded command to the address generator 11 and to the arithmetic unit 21 in the data path unit 20. Then, based on the command received by the address generator 11, an address is generated and data read from that address in the memory 200 is transmitted to the general register 22 of the data path unit 20. Thereafter, the data circulates between the arithmetic unit 21 and the general register 22 (CPU cycle).

The arithmetic unit 21 further includes: a pseudo carry generator 21$a$, which serves as a combinational circuit constituting arithmetic operation means for performing the squaring calculations for a floating-point number, and also as a combinational circuit constituting carry look ahead means for performing a look ahead operation during the addition of the lower bits of the floating-point number; and an MSB look ahead circuit 21$b$ that serves as a combinational circuit constituting MSB look ahead means for performing a look ahead operation to establish the location of the MSB in the addition results of the floating-point number.

The squaring multiplier of the floating-point number for this invention is provided by especially specifying and optimizing the squaring calculation function of the arithmetic unit 21 in FIG. 1. Therefore, the processor 100, including the arithmetic unit 21, is used as a dedicated computer for a three-dimensional graphics engine or for a scientific calculations.

The above described two methods for increasing the processing speed of the squaring multiplier for the floating-point number will now be described in detail.

(1) Method for performing a carry look ahead operation to increase the floating-point number addition speed During the addition of floating-point numbers, the higher bits of mantissas are employed as effective bits, and the lower bits are used for the rounding off process. Therefore, regardless of the bit values, the only determinations that are required are those to determine whether a carry is generated and whether a bit value of 1 is present.

Thus, so long as, for the addition of numerical values, rather than having to perform actual calculations for a lower bit all that is necessary is for information for the bit (whether a carry is generated and whether a bit value of 1 is present) to be generated by a combinational circuit (the pseudo carry generator 21$a$), the squaring calculations for a floating-point number can be performed quickly using a simple circuit configuration.

For the constitution of the pseudo carry generator 21a, an explanation will now be given for a rounding off signal and the number of carry signals employed during the squaring calculations performed for a floating-point number.

For the example calculation in FIG. 8, the number of carry signals employed and a rounding off signal will now be described, beginning with the lowest bit.

<Position s0>

Since at position s0 a0 is the only term to be added, the addition result is a0 and no carry is generated, and the rounding off result is a0. Therefore, when the carry signal at this digit is defined as Carry0 and the rounding off signal is defined as Round0, the following equations are established.

$$s0=a0$$

$$Carry0=0$$

$$Round0=a0$$

<Position s1>

Since there is no term to be added at position s1, no carry is generated and the rounding off results are stored. Thus, when the carry signal for this digit is defined as Carry1 and the rounding off signal is defined as Round1, the following equations are established.

$$s1=0$$

$$Carry1=0$$

$$Round1=a0$$

<Position s2>

At position s2, two terms a1 and a1a0 are added, and only Carry1 from the lower position need be added to the addition results. Since Carry1 is always 0 based on the above studies for positions s0 and s1, the relationship between the bit pattern and the output of a1a0 conforms to the following truth table.

| a1 | a0 | a1 | a1a0 | Carry1 | Total |
|----|----|----|------|--------|-------|
| 0  | 0  |    |      |        |       |
| 0  | 1  |    |      |        |       |
| 1  | 0  | 1  |      |        | 1     |
| 1  | 1  | 1  | 1    |        | 2     |

Since the total of the number of effective terms is equal to or smaller than 2, only one carry signal is generated, and the rounding off result is updated. Therefore, when the carry signal for this digit is defined as Carry2 and the rounding off signal is defined as Round2, the following equations are established.

$$Carry1=a1a0$$

$$Round2=Round1+a1*-a0=a0+a1$$

<Position s3>

The term a2a0 is added at position s3. The truth table to obtain carry signal Carry3 and rounding off signal Round3 is as follows:

| a2 | a1 | a0 | a2a0 | Carry2 | Total |
|----|----|----|------|--------|-------|
| 0  | 0  | 0  |      |        |       |
| 0  | 0  | 1  |      |        |       |
| 0  | 1  | 0  |      |        |       |
| 0  | 1  | 1  |      | 1      | 1     |
| 1  | 0  | 0  |      |        |       |
| 1  | 0  | 1  | 1    |        | 1     |
| 1  | 1  | 0  |      |        |       |
| 1  | 1  | 1  | 1    | 1      | 2     |

Thus, the following equations are established for the carry signal Carry3 and the rounding off signal Round3 for this digit.

$$Round3=Round2+-a2*a1*a0+a2*-a1*a0=a0+a1$$

$$Carry3=a2*a1*a0$$

<Position s4>

The terms a2, a3a0 and a2a1 are added, and the truth table to obtain carry signal Carry4 and rounding off signal Round4 is as follows:

| a3 | a2 | a1 | a0 | a2 | a3a0 | a2a1 | Carry3 | Total |
|----|----|----|----|----|----|----|----|----|
| 0 | 0 | 0 | 0 |   |   |   |   |   |
| 0 | 0 | 0 | 1 |   |   |   |   |   |
| 0 | 0 | 1 | 0 |   |   |   |   |   |
| 0 | 0 | 1 | 1 |   |   |   |   |   |
| 0 | 1 | 0 | 0 | 1 |   |   |   | 1 |
| 0 | 1 | 0 | 1 | 1 |   |   |   | 1 |
| 0 | 1 | 1 | 0 | 1 |   | 1 |   | 2 |
| 0 | 1 | 1 | 1 | 1 |   | 1 | 1 | 3 |
| 1 | 0 | 0 | 0 |   |   |   |   |   |
| 1 | 0 | 0 | 1 |   | 1 |   |   | 1 |
| 1 | 0 | 1 | 0 |   |   |   |   |   |
| 1 | 0 | 1 | 1 |   | 1 |   |   | 1 |
| 1 | 1 | 0 | 0 | 1 |   |   |   | 1 |
| 1 | 1 | 0 | 1 | 1 | 1 |   |   | 2 |
| 1 | 1 | 1 | 0 | 1 |   | 1 |   | 2 |
| 1 | 1 | 1 | 1 | 1 | 1 | 1 | 1 | 4 |

Thus, the truth table for Round4 and Carry4 is as follows:

| a3 | a2 | a1 | a0 | Total | Round4 | Carry4 |
|----|----|----|----|-------|--------|--------|
| 0 | 0 | 0 | 0 |   |   |   |
| 0 | 0 | 0 | 1 |   |   |   |
| 0 | 0 | 1 | 0 |   |   |   |
| 0 | 0 | 1 | 1 |   |   |   |
| 0 | 1 | 0 | 0 | 1 | 1 |   |
| 0 | 1 | 0 | 1 | 1 | 1 |   |
| 0 | 1 | 1 | 0 | 2 |   | 1 |
| 0 | 1 | 1 | 1 | 3 | 1 | 1 |
| 1 | 0 | 0 | 0 |   |   |   |
| 1 | 0 | 0 | 1 | 1 | 1 |   |
| 1 | 0 | 1 | 0 |   |   |   |
| 1 | 0 | 1 | 1 | 1 | 1 |   |
| 1 | 1 | 0 | 0 | 1 | 1 |   |
| 1 | 1 | 0 | 1 | 2 |   | 1 |
| 1 | 1 | 1 | 0 | 2 |   | 1 |
| 1 | 1 | 1 | 1 | 4 |   | 1 |

Therefore, the following equations are established for the carry signal Carry4 and the rounding off signal Round4 for this digit.

$$Round4 = Round3 + ([a3 \ldots a0])$$
$$= 0100, 0101, 0111, 1001, 1011, 1100)$$
$$= (a0 + a1) + ([a3 \ldots a0] = 0100, 1100)$$
$$= a0 + a1 + a2$$

$$Carry4a = a2a1$$

$$Carry4b = a3a2a0$$

<Position s5>

Terms $a4a0$ and $a3a1$ are added at position s5, and the truth table for obtaining carry signal Carry5 and rounding off signal Round5 is as follows:

| a4 | a3 | a2 | a1 | a0 | a4a0 | a3a1 | Carry4 | Total |
|---|---|---|---|---|---|---|---|---|
| 0 | 0 | 0 | 0 | 0 | | | | |
| 0 | 0 | 0 | 0 | 1 | | | | |
| 0 | 0 | 0 | 1 | 0 | | | | |
| 0 | 0 | 0 | 1 | 1 | | | | |
| 0 | 0 | 1 | 0 | 0 | | | | |
| 0 | 0 | 1 | 0 | 1 | | | | |
| 0 | 0 | 1 | 1 | 0 | | | 1 | 1 |
| 0 | 0 | 1 | 1 | 1 | | | 1 | 1 |
| 0 | 1 | 0 | 0 | 0 | | | | |
| 0 | 1 | 0 | 0 | 1 | | | | |
| 0 | 1 | 0 | 1 | 0 | | 1 | | 1 |
| 0 | 1 | 0 | 1 | 1 | | 1 | | 1 |
| 0 | 1 | 1 | 0 | 0 | | | | |
| 0 | 1 | 1 | 0 | 1 | | | 1 | 1 |
| 0 | 1 | 1 | 1 | 0 | | 1 | 1 | 2 |
| 0 | 1 | 1 | 1 | 1 | | 1 | 2 | 3 |
| 1 | 0 | 0 | 0 | 0 | | | | |
| 1 | 0 | 0 | 0 | 1 | 1 | | | 1 |
| 1 | 0 | 0 | 1 | 0 | | | | |
| 1 | 0 | 0 | 1 | 1 | 1 | | 1 | 2 |
| 1 | 0 | 1 | 0 | 0 | | | | |
| 1 | 0 | 1 | 0 | 1 | 1 | | | 1 |
| 1 | 0 | 1 | 1 | 0 | | | 1 | 1 |
| 1 | 0 | 1 | 1 | 1 | 1 | | 1 | 2 |
| 1 | 1 | 0 | 0 | 0 | | | | |
| 1 | 1 | 0 | 0 | 1 | 1 | | | 1 |
| 1 | 1 | 0 | 1 | 0 | | 1 | | 1 |
| 1 | 1 | 0 | 1 | 1 | 1 | 1 | | 2 |
| 1 | 1 | 1 | 0 | 0 | | | | |
| 1 | 1 | 1 | 0 | 1 | 1 | | 1 | 2 |
| 1 | 1 | 1 | 1 | 0 | | 1 | 1 | 2 |
| 1 | 1 | 1 | 1 | 1 | 1 | 1 | 2 | 4 |

Thus, the truth table for Round5 and Carry5 is as follows:

| a4 | a3 | a2 | a1 | a0 | Total | Carry5 | Round5 |
|---|---|---|---|---|---|---|---|
| 0 | 0 | 0 | 0 | 0 | | | |
| 0 | 0 | 0 | 0 | 1 | | | |
| 0 | 0 | 0 | 1 | 0 | | | |
| 0 | 0 | 0 | 1 | 1 | | | |
| 0 | 0 | 1 | 0 | 0 | | | |
| 0 | 0 | 1 | 0 | 1 | | | |
| 0 | 0 | 1 | 1 | 0 | 1 | | 1 |
| 0 | 0 | 1 | 1 | 1 | 1 | | 1 |
| 0 | 1 | 0 | 0 | 0 | | | |
| 0 | 1 | 0 | 0 | 1 | | | |
| 0 | 1 | 0 | 1 | 0 | 1 | | 1 |
| 0 | 1 | 0 | 1 | 1 | 1 | | 1 |
| 0 | 1 | 1 | 0 | 0 | | | |
| 0 | 1 | 1 | 0 | 1 | 1 | | 1 |
| 0 | 1 | 1 | 1 | 0 | 2 | 1 | |
| 0 | 1 | 1 | 1 | 1 | 3 | 1 | 1 |
| 1 | 0 | 0 | 0 | 0 | | | |
| 1 | 0 | 0 | 0 | 1 | 1 | | 1 |
| 1 | 0 | 0 | 1 | 0 | | | |
| 1 | 0 | 0 | 1 | 1 | 2 | 1 | |
| 1 | 0 | 1 | 0 | 0 | | | |
| 1 | 0 | 1 | 0 | 1 | 1 | | 1 |
| 1 | 0 | 1 | 1 | 0 | 1 | | 1 |
| 1 | 0 | 1 | 1 | 1 | 2 | 1 | |
| 1 | 1 | 0 | 0 | 0 | | | |
| 1 | 1 | 0 | 0 | 1 | 1 | | 1 |
| 1 | 1 | 0 | 1 | 0 | 1 | | 1 |
| 1 | 1 | 0 | 1 | 1 | 2 | 1 | |
| 1 | 1 | 1 | 0 | 0 | | | |
| 1 | 1 | 1 | 0 | 1 | 2 | 1 | |
| 1 | 1 | 1 | 1 | 0 | 2 | 1 | |
| 1 | 1 | 1 | 1 | 1 | 4 | 2 | |

In this case, the pseudo carry generator for Carry5 is generated.

In the above truth table, the terms for which the value of Carry5 is set to "1" or "2" are collected as follows:

| a4 | a3 | a2 | a1 | a0 | Carry5 |
|---|---|---|---|---|---|
| 0 | 1 | 1 | 1 | 0 | 1 |
| 0 | 1 | 1 | 1 | 1 | 1 |
| 1 | 0 | 1 | 1 | 1 | 1 |
| 1 | 1 | 0 | 1 | 1 | 1 |
| 1 | 1 | 1 | 0 | 1 | 1 |
| 1 | 1 | 1 | 1 | 0 | 1 |
| 1 | 1 | 1 | 1 | 1 | 2 |

From this table, four prime implicants of Carry5 are found: $a3a2a1$, $a4a2a1a0$, $a4a3a2a0$ and $a4a3a1a0$. To find these prime implicants, Quin-McCluskey's method, which is a well known logical compression method, can be employed. The following relationship is obtained between three of these prime implicants and Carry5.

$$pt0 = a3a2a1$$

$$pt1 = a4a2a1a0$$

$$pt2 = a4a3a2a0$$

$$pt3 = a4a3a1a0$$

| a4 | a3 | a2 | a1 | a0 | pt0 | pt1 | pt2 | pt3 | Carry5 | |
|---|---|---|---|---|---|---|---|---|---|---|
| 0 | 1 | 1 | 1 | 0 | 1 | 0 | 0 | 0 | 1 | |
| 0 | 1 | 1 | 1 | 1 | 1 | 0 | 0 | 0 | 1 | |
| 1 | 0 | 1 | 1 | 1 | 0 | 1 | 0 | 0 | 1 | |
| 1 | 1 | 0 | 1 | 1 | 0 | 0 | 0 | 1 | 1 | |
| 1 | 1 | 1 | 0 | 1 | 0 | 0 | 1 | 0 | 1 | |
| 1 | 1 | 1 | 1 | 0 | 1 | 0 | 0 | 0 | 1 | |
| 1 | 1 | 1 | 1 | 1 | 1 | 1 | 1 | 1 | 2 | … (i) |

As is apparent from (i), to generate two pseudo carries, pt0, pt1, pt2 and pt3 need only be separated into two groups. For this, arbitrary grouping may be employed, yielding the equations $$Carry5a = pt0 = a3a2a1 \text{ and}$$

$$Carry5b = pt1 + pt2 + pt3 = a4a0(a3a2 + a2a1 + a1a3),$$

for example. Further, Round5 can be generated using the following logical equation.

$$\text{Round}5 = a2 + a1 + a0$$

These three equations can be employed as proxies for the logic up to position s5 of the squaring calculation circuit.

Position s6>

At position s6, terms a3, a5a0, a4a1 and a3a2 are added, and the truth table for the total number of terms is as follows:

| a5 | a4 | a3 | a2 | a1 | a0 | a3 | a5a0 | a4a1 | a3a2 | Carry5 | Total |
|---|---|---|---|---|---|---|---|---|---|---|---|
| 0 | 0 | 0 | 0 | 0 | 0 |   |   |   |   |   |   |
| 0 | 0 | 0 | 0 | 0 | 1 |   |   |   |   |   |   |
| 0 | 0 | 0 | 0 | 1 | 0 |   |   |   |   |   |   |
| 0 | 0 | 0 | 0 | 1 | 1 |   |   |   |   |   |   |
| 0 | 0 | 0 | 1 | 0 | 0 |   |   |   |   |   |   |
| 0 | 0 | 0 | 1 | 0 | 1 |   |   |   |   |   |   |
| 0 | 0 | 0 | 1 | 1 | 0 |   |   |   |   |   |   |
| 0 | 0 | 0 | 1 | 1 | 1 |   |   |   |   |   |   |
| 0 | 0 | 1 | 0 | 0 | 0 | 1 |   |   |   |   | 1 |
| 0 | 0 | 1 | 0 | 0 | 1 | 1 |   |   |   |   | 1 |
| 0 | 0 | 1 | 0 | 1 | 0 | 1 |   |   |   |   | 1 |
| 0 | 0 | 1 | 0 | 1 | 1 | 1 |   |   |   |   | 1 |
| 0 | 0 | 1 | 1 | 0 | 0 | 1 |   |   | 1 |   | 2 |
| 0 | 0 | 1 | 1 | 0 | 1 | 1 |   |   | 1 |   | 2 |
| 0 | 0 | 1 | 1 | 1 | 0 | 1 |   |   | 1 | 1 | 3 |
| 0 | 0 | 1 | 1 | 1 | 1 | 1 |   |   | 1 | 1 | 3 |
| 0 | 1 | 0 | 0 | 0 | 0 |   |   |   |   |   |   |
| 0 | 1 | 0 | 0 | 0 | 1 |   |   |   |   |   |   |
| 0 | 1 | 0 | 0 | 1 | 0 |   |   | 1 |   |   | 1 |
| 0 | 1 | 0 | 0 | 1 | 1 |   |   | 1 |   |   | 1 |
| 0 | 1 | 0 | 1 | 0 | 0 |   |   |   |   |   |   |
| 0 | 1 | 0 | 1 | 0 | 1 |   |   |   |   |   |   |
| 0 | 1 | 0 | 1 | 1 | 0 |   |   | 1 |   |   | 1 |
| 0 | 1 | 0 | 1 | 1 | 1 |   |   | 1 |   | 1 | 2 |
| 0 | 1 | 1 | 0 | 0 | 0 | 1 |   |   |   |   | 1 |
| 0 | 1 | 1 | 0 | 0 | 1 | 1 |   |   |   |   | 1 |
| 0 | 1 | 1 | 0 | 1 | 0 | 1 |   | 1 |   |   | 2 |
| 0 | 1 | 1 | 0 | 1 | 1 | 1 |   | 1 |   | 1 | 3 |
| 0 | 1 | 1 | 1 | 0 | 0 | 1 |   |   | 1 |   | 2 |
| 0 | 1 | 1 | 1 | 0 | 1 | 1 |   |   | 1 | 1 | 3 |
| 0 | 1 | 1 | 1 | 1 | 0 | 1 |   | 1 | 1 | 1 | 4 |
| 0 | 1 | 1 | 1 | 1 | 1 | 1 |   | 1 | 1 | 2 | 5 |
| 1 | 0 | 0 | 0 | 0 | 0 |   |   |   |   |   |   |
| 1 | 0 | 0 | 0 | 0 | 1 |   | 1 |   |   |   | 1 |
| 1 | 0 | 0 | 0 | 1 | 0 |   |   |   |   |   |   |
| 1 | 0 | 0 | 0 | 1 | 1 |   | 1 |   |   |   | 1 |
| 1 | 0 | 0 | 1 | 0 | 0 |   |   |   |   |   |   |
| 1 | 0 | 0 | 1 | 0 | 1 |   | 1 |   |   |   | 1 |
| 1 | 0 | 0 | 1 | 1 | 0 |   |   |   |   |   |   |
| 1 | 0 | 0 | 1 | 1 | 1 |   | 1 |   |   |   | 1 |
| 1 | 0 | 1 | 0 | 0 | 0 | 1 |   |   |   |   | 1 |
| 1 | 0 | 1 | 0 | 0 | 1 | 1 | 1 |   |   |   | 2 |
| 1 | 0 | 1 | 0 | 1 | 0 | 1 |   |   |   |   | 1 |
| 1 | 0 | 1 | 0 | 1 | 1 | 1 | 1 |   |   |   | 2 |
| 1 | 0 | 1 | 1 | 0 | 0 | 1 |   |   | 1 |   | 2 |
| 1 | 0 | 1 | 1 | 0 | 1 | 1 | 1 |   | 1 |   | 3 |
| 1 | 0 | 1 | 1 | 1 | 0 | 1 |   |   | 1 | 1 | 3 |
| 1 | 0 | 1 | 1 | 1 | 1 | 1 | 1 |   | 1 | 1 | 3 |
| 1 | 1 | 0 | 0 | 0 | 0 |   |   |   |   |   |   |
| 1 | 1 | 0 | 0 | 0 | 1 |   | 1 |   |   |   | 1 |
| 1 | 1 | 0 | 0 | 1 | 0 |   |   | 1 |   |   | 1 |
| 1 | 1 | 0 | 0 | 1 | 1 |   | 1 | 1 |   |   | 2 |
| 1 | 1 | 0 | 1 | 0 | 0 |   |   |   |   |   |   |
| 1 | 1 | 0 | 1 | 0 | 1 |   | 1 |   |   |   | 1 |
| 1 | 1 | 0 | 1 | 1 | 0 |   |   | 1 |   |   | 1 |
| 1 | 1 | 0 | 1 | 1 | 1 |   | 1 | 1 |   | 1 | 3 |
| 1 | 1 | 1 | 0 | 0 | 0 | 1 |   |   |   |   | 1 |
| 1 | 1 | 1 | 0 | 0 | 1 | 1 | 1 |   |   |   | 2 |
| 1 | 1 | 1 | 0 | 1 | 0 | 1 |   | 1 |   |   | 2 |
| 1 | 1 | 1 | 0 | 1 | 1 | 1 | 1 | 1 |   | 1 | 4 |
| 1 | 1 | 1 | 1 | 0 | 0 | 1 |   |   | 1 |   | 2 |
| 1 | 1 | 1 | 1 | 0 | 1 | 1 | 1 |   | 1 | 1 | 4 |
| 1 | 1 | 1 | 1 | 1 | 0 | 1 |   | 1 | 1 | 1 | 4 |
| 1 | 1 | 1 | 1 | 1 | 1 | 1 | 1 | 1 | 1 | 2 | 6 |

When this truth table is arranged for Carry6 and Round6, the following table is obtained.

| a5 | a4 | a3 | a2 | a1 | a0 | Total | Carry6 | Round6 |
|---|---|---|---|---|---|---|---|---|
| 0 | 0 | 1 | 0 | 0 | 0 | 1 |   | 1 |
| 0 | 0 | 1 | 0 | 0 | 1 | 1 |   | 1 |
| 0 | 0 | 1 | 0 | 1 | 0 | 1 |   | 1 |
| 0 | 0 | 1 | 0 | 1 | 1 | 1 |   | 1 |
| 0 | 0 | 1 | 1 | 0 | 0 | 2 | 1 |   |
| 0 | 0 | 1 | 1 | 0 | 1 | 2 | 1 |   |
| 0 | 0 | 1 | 1 | 1 | 0 | 3 | 1 | 1 |
| 0 | 0 | 1 | 1 | 1 | 1 | 3 | 1 | 1 |
| 0 | 1 | 0 | 0 | 1 | 0 | 1 |   | 1 |
| 0 | 1 | 0 | 0 | 1 | 1 | 1 |   | 1 |
| 0 | 1 | 0 | 1 | 1 | 0 | 1 |   | 1 |
| 0 | 1 | 0 | 1 | 1 | 1 | 2 | 1 |   |
| 0 | 1 | 1 | 0 | 0 | 0 | 1 |   | 1 |
| 0 | 1 | 1 | 0 | 0 | 1 | 1 |   | 1 |
| 0 | 1 | 1 | 0 | 1 | 0 | 2 | 1 |   |
| 0 | 1 | 1 | 0 | 1 | 1 | 3 | 1 | 1 |
| 0 | 1 | 1 | 1 | 0 | 0 | 2 | 1 |   |
| 0 | 1 | 1 | 1 | 0 | 1 | 3 | 1 | 1 |
| 0 | 1 | 1 | 1 | 1 | 0 | 4 | 2 |   |
| 0 | 1 | 1 | 1 | 1 | 1 | 5 | 2 | 1 |
| 1 | 0 | 0 | 0 | 0 | 1 | 1 |   | 1 |
| 1 | 0 | 0 | 0 | 1 | 1 | 1 |   | 1 |
| 1 | 0 | 0 | 1 | 0 | 1 | 1 |   | 1 |
| 1 | 0 | 0 | 1 | 1 | 1 | 1 |   | 1 |
| 1 | 0 | 1 | 0 | 0 | 0 | 1 |   | 1 |
| 1 | 0 | 1 | 0 | 0 | 1 | 2 | 1 |   |
| 1 | 0 | 1 | 0 | 1 | 0 | 1 |   | 1 |
| 1 | 0 | 1 | 0 | 1 | 1 | 2 | 1 |   |
| 1 | 0 | 1 | 1 | 0 | 0 | 2 | 1 |   |
| 1 | 0 | 1 | 1 | 0 | 1 | 3 | 1 | 1 |
| 1 | 0 | 1 | 1 | 1 | 0 | 3 | 1 | 1 |
| 1 | 0 | 1 | 1 | 1 | 1 | 3 | 1 | 1 |
| 1 | 1 | 0 | 0 | 0 | 1 | 1 |   | 1 |
| 1 | 1 | 0 | 0 | 1 | 0 | 1 |   | 1 |
| 1 | 1 | 0 | 0 | 1 | 1 | 2 | 1 |   |
| 1 | 1 | 0 | 1 | 0 | 1 | 1 |   | 1 |
| 1 | 1 | 0 | 1 | 1 | 0 | 1 |   | 1 |
| 1 | 1 | 0 | 1 | 1 | 1 | 3 | 1 | 1 |
| 1 | 1 | 1 | 0 | 0 | 0 | 1 |   | 1 |
| 1 | 1 | 1 | 0 | 0 | 1 | 2 | 1 |   |
| 1 | 1 | 1 | 0 | 1 | 0 | 2 | 1 |   |
| 1 | 1 | 1 | 0 | 1 | 1 | 4 | 2 |   |
| 1 | 1 | 1 | 1 | 0 | 0 | 2 | 1 |   |
| 1 | 1 | 1 | 1 | 0 | 1 | 4 | 2 |   |
| 1 | 1 | 1 | 1 | 1 | 0 | 4 | 2 |   |
| 1 | 1 | 1 | 1 | 1 | 1 | 6 | 3 |   |

This table is further rearranged for Carry6, and the following table is obtained.

| a5 | a4 | a3 | a2 | a1 | a0 | Carry6 |
|---|---|---|---|---|---|---|
| 0 | 0 | 1 | 1 | 0 | 0 | 1 |
| 0 | 0 | 1 | 1 | 0 | 1 | 1 |
| 0 | 0 | 1 | 1 | 1 | 0 | 1 |
| 0 | 0 | 1 | 1 | 1 | 1 | 1 |
| 0 | 1 | 0 | 1 | 1 | 1 | 1 |
| 0 | 1 | 1 | 0 | 1 | 0 | 1 |
| 0 | 1 | 1 | 0 | 1 | 1 | 1 |
| 0 | 1 | 1 | 1 | 0 | 0 | 1 |

-continued

| a5 | a4 | a3 | a2 | a1 | a0 | Carry6 |
|----|----|----|----|----|----|--------|
| 0 | 1 | 1 | 1 | 0 | 1 | 1 |
| 0 | 1 | 1 | 1 | 1 | 0 | 2 |
| 0 | 1 | 1 | 1 | 1 | 1 | 1 |
| 1 | 0 | 1 | 0 | 0 | 1 | 1 |
| 1 | 0 | 1 | 0 | 1 | 1 | 1 |
| 1 | 0 | 1 | 1 | 0 | 0 | 1 |
| 1 | 0 | 1 | 1 | 0 | 1 | 1 |
| 1 | 0 | 1 | 1 | 1 | 0 | 1 |
| 1 | 0 | 1 | 1 | 1 | 1 | 1 |
| 1 | 1 | 0 | 0 | 1 | 1 | 1 |
| 1 | 1 | 0 | 1 | 1 | 1 | 1 |
| 1 | 1 | 1 | 0 | 0 | 1 | 1 |
| 1 | 1 | 1 | 0 | 1 | 0 | 1 |
| 1 | 1 | 1 | 0 | 1 | 1 | 2 |
| 1 | 1 | 1 | 1 | 0 | 0 | 1 |
| 1 | 1 | 1 | 1 | 0 | 1 | 2 |
| 1 | 1 | 1 | 1 | 1 | 0 | 2 |
| 1 | 1 | 1 | 1 | 1 | 1 | 3 |

When the above table is logically compressed, the prime implicants of Carry6 can be obtained as follows:

| a5 | a4 | a3 | a2 | a1 | a0 | Carry6 |   |
|----|----|----|----|----|----|--------|---|
| — | — | 1 | 1 | — | — | 1 | (i) |
| — | 1 | 1 | — | 1 | — | 1 | (ii) |
| 1 | — | 1 | — | — | — | 1 | (iii) |
| 1 | 1 | — | — | 1 | 1 | 1 | (iv) |
| — | 1 | — | 1 | 1 | 1 | 1 | (v) |

The contribution to the output made by each prime implicant is as follows:

| a5 | a4 | a3 | a2 | a1 | a0 | (i) | (ii) | (iii) | (iv) | (v) | Carry6 |
|----|----|----|----|----|----|-----|------|-------|------|-----|--------|
| 0 | 0 | 1 | 1 | 0 | 0 | 1 | | | | | 1 |
| 0 | 0 | 1 | 1 | 0 | 1 | 1 | | | | | 1 |
| 0 | 0 | 1 | 1 | 1 | 0 | 1 | | | | | 1 |
| 0 | 0 | 1 | 1 | 1 | 1 | 1 | | | | | 1 |
| 0 | 1 | 0 | 1 | 1 | 1 | | | | | 1 | 1 |
| 0 | 1 | 1 | 0 | 1 | 0 | | 1 | | | | 1 |
| 0 | 1 | 1 | 0 | 1 | 1 | | 1 | | | | 1 |
| 0 | 1 | 1 | 1 | 0 | 0 | 1 | | | | | 1 |
| 0 | 1 | 1 | 1 | 0 | 1 | 1 | | | | | 1 |
| 0 | 1 | 1 | 1 | 1 | 0 | 1 | 1 | | | | 2 |
| 0 | 1 | 1 | 1 | 1 | 1 | 1 | 1 | | | 1 | 2 |
| 1 | 0 | 1 | 0 | 0 | 1 | | | 1 | | | 1 |
| 1 | 0 | 1 | 0 | 1 | 1 | | | 1 | | | 1 |
| 1 | 0 | 1 | 1 | 0 | 0 | 1 | | | | | 1 |
| 1 | 0 | 1 | 1 | 0 | 1 | 1 | | 1 | | | 1 (vi) |
| 1 | 0 | 1 | 1 | 1 | 0 | 1 | | | | | 1 |
| 1 | 0 | 1 | 1 | 1 | 1 | 1 | | 1 | | | 1 (vi) |
| 1 | 1 | 0 | 0 | 1 | 1 | | | | 1 | | 1 |
| 1 | 1 | 0 | 1 | 1 | 1 | | | | 1 | 1 | 1 |
| 1 | 1 | 1 | 0 | 0 | 1 | | | 1 | | | 1 |
| 1 | 1 | 1 | 0 | 1 | 0 | | 1 | | | | 1 |
| 1 | 1 | 1 | 0 | 1 | 1 | | 1 | 1 | 1 | | 2 |
| 1 | 1 | 1 | 1 | 0 | 0 | 1 | | | | | 1 |
| 1 | 1 | 1 | 1 | 0 | 1 | 1 | | 1 | | | 2 (vii) |
| 1 | 1 | 1 | 1 | 1 | 0 | 1 | 1 | | | | 2 |
| 1 | 1 | 1 | 1 | 1 | 1 | 1 | 1 | 1 | 1 | 1 | 3 |

When only the prime implicants are considered in the above table, by referring to (vi), (i) and (iii) belong to the same group, while by referring to (vii), (i) and (iii) belong to different groups, so that these groups contradict each other. In order to remove this contradiction, a new term must be created such that the prime implicant is set (the value becomes 1) at (vii), and is not set (the value does not become 1) at (vi). Therefore, a new term, (iii)'=a5a4a3a0, is prepared, wherein (iii)' is a partial term. At this time, there are three carry signals, as follows:

Carry6a=(i)+(iii)+(iv)+(v)

Carry6b=(ii)

Carry6c=(iii)'

Further, rounding off signal Round6 can be generated using the following logical equation.

Round6=a3+a2+a1+a0

As is described above, there is one case wherein a pseudo carry can not be generated merely only by referring to the inclusive relationship. In this case, a new term, such as (iii)', is prepared for performing a logical calculation. This new term is not a prime implicant but is a partial term of a specific term.

<Position s7>

At position s7, terms a6a0, a5a1 and a4a2 are added. The truth table for the total number of terms is as follows:

| a6 | a5 | a4 | a3 | a2 | a1 | a0 | a6a0 | a5a1 | a4a2 | Carry6 | Total |
|----|----|----|----|----|----|----|------|------|------|--------|-------|
| 0 | 0 | 0 | 0 | 0 | 0 | 0 | | | | | |
| 0 | 0 | 0 | 0 | 0 | 0 | 1 | | | | | |
| 0 | 0 | 0 | 0 | 0 | 1 | 0 | | | | | |
| 0 | 0 | 0 | 0 | 0 | 1 | 1 | | | | | |
| 0 | 0 | 0 | 0 | 1 | 0 | 0 | | | | | |
| 0 | 0 | 0 | 0 | 1 | 0 | 1 | | | | | |
| 0 | 0 | 0 | 0 | 1 | 1 | 0 | | | | | |
| 0 | 0 | 0 | 0 | 1 | 1 | 1 | | | | | |
| 0 | 0 | 0 | 1 | 0 | 0 | 0 | | | | | |
| 0 | 0 | 0 | 1 | 0 | 0 | 1 | | | | | |
| 0 | 0 | 0 | 1 | 0 | 1 | 0 | | | | | |
| 0 | 0 | 0 | 1 | 0 | 1 | 1 | | | | | |
| 0 | 0 | 0 | 1 | 1 | 0 | 0 | | | | 1 | 1 |
| 0 | 0 | 0 | 1 | 1 | 0 | 1 | | | | 1 | 1 |
| 0 | 0 | 0 | 1 | 1 | 1 | 0 | | | | 1 | 1 |
| 0 | 0 | 0 | 1 | 1 | 1 | 1 | | | | 1 | 1 |
| 0 | 0 | 1 | 0 | 0 | 0 | 0 | | | | | |
| 0 | 0 | 1 | 0 | 0 | 0 | 1 | | | | | |
| 0 | 0 | 1 | 0 | 0 | 1 | 0 | | | | | |
| 0 | 0 | 1 | 0 | 0 | 1 | 1 | | | | | |
| 0 | 0 | 1 | 0 | 1 | 0 | 0 | | | 1 | | 1 |
| 0 | 0 | 1 | 0 | 1 | 0 | 1 | | | 1 | | 1 |
| 0 | 0 | 1 | 0 | 1 | 1 | 0 | | | 1 | | 1 |
| 0 | 0 | 1 | 0 | 1 | 1 | 1 | | | 1 | 1 | 2 |
| 0 | 0 | 1 | 1 | 0 | 0 | 0 | | | | | |
| 0 | 0 | 1 | 1 | 0 | 0 | 1 | | | | | |
| 0 | 0 | 1 | 1 | 0 | 1 | 0 | | | | 1 | 1 |
| 0 | 0 | 1 | 1 | 0 | 1 | 1 | | | | 1 | 1 |
| 0 | 0 | 1 | 1 | 1 | 0 | 0 | | | 1 | 1 | 2 |
| 0 | 0 | 1 | 1 | 1 | 0 | 1 | | | 1 | 1 | 2 |
| 0 | 0 | 1 | 1 | 1 | 1 | 0 | | 1 | 2 | | 3 |
| 0 | 0 | 1 | 1 | 1 | 1 | 1 | | 1 | 2 | | 3 |
| 0 | 1 | 0 | 0 | 0 | 0 | 0 | | | | | |
| 0 | 1 | 0 | 0 | 0 | 0 | 1 | | | | | |
| 0 | 1 | 0 | 0 | 0 | 1 | 0 | 1 | | | | 1 |
| 0 | 1 | 0 | 0 | 0 | 1 | 1 | 1 | | | | 1 |
| 0 | 1 | 0 | 0 | 1 | 0 | 0 | | | | | |
| 0 | 1 | 0 | 0 | 1 | 0 | 1 | | | | | |
| 0 | 1 | 0 | 0 | 1 | 1 | 0 | 1 | | | | 1 |
| 0 | 1 | 0 | 0 | 1 | 1 | 1 | 1 | | | | 1 |
| 0 | 1 | 0 | 1 | 0 | 0 | 0 | | | | | |
| 0 | 1 | 0 | 1 | 0 | 0 | 1 | | | | 1 | 1 |
| 0 | 1 | 0 | 1 | 0 | 1 | 0 | 1 | | | | 1 |
| 0 | 1 | 0 | 1 | 0 | 1 | 1 | 1 | | | 1 | 2 |
| 0 | 1 | 0 | 1 | 1 | 0 | 0 | | | | 1 | 1 |
| 0 | 1 | 0 | 1 | 1 | 0 | 1 | | | | 1 | 1 |
| 0 | 1 | 0 | 1 | 1 | 1 | 0 | 1 | | | 1 | 2 |
| 0 | 1 | 0 | 1 | 1 | 1 | 1 | 1 | | | 1 | 2 |

-continued

| a6 | a5 | a4 | a3 | a2 | a1 | a0 | a6a0 | a5a1 | a4a2 | Carry6 | Total |
|----|----|----|----|----|----|----|------|------|------|--------|-------|
| 0 | 1 | 1 | 0 | 0 | 0 | 0 |   |   |   |   |   |
| 0 | 1 | 1 | 0 | 0 | 0 | 1 |   |   |   |   |   |
| 0 | 1 | 1 | 0 | 0 | 1 | 0 | 1 |   |   |   | 1 |
| 0 | 1 | 1 | 0 | 0 | 1 | 1 | 1 |   |   | 1 | 2 |
| 0 | 1 | 1 | 0 | 1 | 0 | 0 |   | 1 |   |   | 1 |
| 0 | 1 | 1 | 0 | 1 | 0 | 1 |   | 1 |   |   | 1 |
| 0 | 1 | 1 | 0 | 1 | 1 | 0 | 1 | 1 |   |   | 2 |
| 0 | 1 | 1 | 0 | 1 | 1 | 1 | 1 | 1 |   | 1 | 3 |
| 0 | 1 | 1 | 1 | 0 | 0 | 0 |   |   |   |   |   |
| 0 | 1 | 1 | 1 | 0 | 0 | 1 |   |   |   | 1 | 1 |
| 0 | 1 | 1 | 1 | 0 | 1 | 0 | 1 |   |   | 1 | 2 |
| 0 | 1 | 1 | 1 | 0 | 1 | 1 | 1 |   |   | 2 | 3 |
| 0 | 1 | 1 | 1 | 1 | 0 | 0 |   |   | 1 | 1 | 2 |
| 0 | 1 | 1 | 1 | 1 | 0 | 1 |   |   | 1 | 2 | 3 |
| 0 | 1 | 1 | 1 | 1 | 1 | 0 | 1 |   | 1 | 2 | 4 |
| 0 | 1 | 1 | 1 | 1 | 1 | 1 | 1 | 1 | 1 | 3 | 5 |
| 1 | 0 | 0 | 0 | 0 | 0 | 0 |   |   |   |   |   |
| 1 | 0 | 0 | 0 | 0 | 0 | 1 | 1 |   |   |   | 1 |
| 1 | 0 | 0 | 0 | 0 | 1 | 0 |   |   |   |   |   |
| 1 | 0 | 0 | 0 | 0 | 1 | 1 | 1 |   |   |   | 1 |
| 1 | 0 | 0 | 0 | 1 | 0 | 0 |   |   |   |   |   |
| 1 | 0 | 0 | 0 | 1 | 0 | 1 | 1 |   |   |   | 1 |
| 1 | 0 | 0 | 0 | 1 | 1 | 0 |   |   |   |   |   |
| 1 | 0 | 0 | 0 | 1 | 1 | 1 | 1 |   |   |   | 1 |
| 1 | 0 | 0 | 1 | 0 | 0 | 0 |   |   |   |   |   |
| 1 | 0 | 0 | 1 | 0 | 0 | 1 | 1 |   |   |   | 1 |
| 1 | 0 | 0 | 1 | 0 | 1 | 0 |   |   |   |   |   |
| 1 | 0 | 0 | 1 | 0 | 1 | 1 | 1 |   |   |   | 1 |
| 1 | 0 | 0 | 1 | 1 | 0 | 0 |   |   |   | 1 | 1 |
| 1 | 0 | 0 | 1 | 1 | 0 | 1 | 1 |   |   | 1 | 2 |
| 1 | 0 | 0 | 1 | 1 | 1 | 0 |   |   |   | 1 | 1 |
| 1 | 0 | 0 | 1 | 1 | 1 | 1 | 1 |   |   | 1 | 2 |
| 1 | 0 | 1 | 0 | 0 | 0 | 0 |   |   |   |   |   |
| 1 | 0 | 1 | 0 | 0 | 0 | 1 | 1 |   |   |   | 1 |
| 1 | 0 | 1 | 0 | 0 | 1 | 0 |   |   |   |   |   |
| 1 | 0 | 1 | 0 | 0 | 1 | 1 | 1 |   |   |   | 1 |
| 1 | 0 | 1 | 0 | 1 | 0 | 0 |   |   | 1 |   | 1 |
| 1 | 0 | 1 | 0 | 1 | 0 | 1 | 1 |   | 1 |   | 2 |
| 1 | 0 | 1 | 0 | 1 | 1 | 0 |   |   | 1 |   | 1 |
| 1 | 0 | 1 | 0 | 1 | 1 | 1 | 1 |   | 1 | 1 | 3 |
| 1 | 0 | 1 | 1 | 0 | 0 | 0 |   |   |   |   |   |
| 1 | 0 | 1 | 1 | 0 | 0 | 1 | 1 |   |   |   | 1 |
| 1 | 0 | 1 | 1 | 0 | 1 | 0 |   |   |   | 1 | 1 |
| 1 | 0 | 1 | 1 | 0 | 1 | 1 | 1 |   |   | 1 | 2 |
| 1 | 0 | 1 | 1 | 1 | 0 | 0 |   |   | 1 | 1 | 2 |
| 1 | 0 | 1 | 1 | 1 | 0 | 1 | 1 |   | 1 | 1 | 3 |
| 1 | 0 | 1 | 1 | 1 | 1 | 0 |   |   | 1 | 2 | 3 |
| 1 | 0 | 1 | 1 | 1 | 1 | 1 | 1 |   | 1 | 2 | 4 |
| 1 | 1 | 0 | 0 | 0 | 0 | 0 |   |   |   |   |   |
| 1 | 1 | 0 | 0 | 0 | 0 | 1 | 1 |   |   |   | 1 |
| 1 | 1 | 0 | 0 | 0 | 1 | 0 |   | 1 |   |   | 1 |
| 1 | 1 | 0 | 0 | 0 | 1 | 1 | 1 | 1 |   |   | 2 |
| 1 | 1 | 0 | 0 | 1 | 0 | 0 |   |   |   |   |   |
| 1 | 1 | 0 | 0 | 1 | 0 | 1 | 1 |   |   |   | 1 |
| 1 | 1 | 0 | 0 | 1 | 1 | 0 |   | 1 |   |   | 1 |
| 1 | 1 | 0 | 0 | 1 | 1 | 1 | 1 | 1 |   |   | 2 |
| 1 | 1 | 0 | 1 | 0 | 0 | 0 |   |   |   |   |   |
| 1 | 1 | 0 | 1 | 0 | 0 | 1 | 1 |   |   | 1 | 2 |
| 1 | 1 | 0 | 1 | 0 | 1 | 0 |   | 1 |   |   | 1 |
| 1 | 1 | 0 | 1 | 0 | 1 | 1 | 1 | 1 |   | 1 | 3 |
| 1 | 1 | 0 | 1 | 1 | 0 | 0 |   |   |   | 1 | 1 |
| 1 | 1 | 0 | 1 | 1 | 0 | 1 | 1 |   |   | 1 | 2 |
| 1 | 1 | 0 | 1 | 1 | 1 | 0 |   | 1 |   | 1 | 2 |
| 1 | 1 | 0 | 1 | 1 | 1 | 1 | 1 | 1 |   | 1 | 4 |
| 1 | 1 | 1 | 0 | 0 | 0 | 0 |   |   |   |   |   |
| 1 | 1 | 1 | 0 | 0 | 0 | 1 | 1 |   |   |   | 1 |
| 1 | 1 | 1 | 0 | 0 | 1 | 0 |   | 1 |   |   | 1 |
| 1 | 1 | 1 | 0 | 0 | 1 | 1 | 1 | 1 |   | 1 | 3 |
| 1 | 1 | 1 | 0 | 1 | 0 | 0 |   |   | 1 |   | 1 |
| 1 | 1 | 1 | 0 | 1 | 0 | 1 | 1 |   | 1 |   | 2 |
| 1 | 1 | 1 | 0 | 1 | 1 | 0 |   | 1 | 1 |   | 2 |
| 1 | 1 | 1 | 0 | 1 | 1 | 1 | 1 | 1 | 1 | 1 | 4 |
| 1 | 1 | 1 | 1 | 0 | 0 | 0 |   |   |   | 1 | 1 |
| 1 | 1 | 1 | 1 | 0 | 0 | 1 | 1 |   |   | 1 | 2 |
| 1 | 1 | 1 | 1 | 0 | 1 | 0 |   | 1 |   | 1 | 2 |
| 1 | 1 | 1 | 1 | 0 | 1 | 1 | 1 | 1 |   | 2 | 4 |
| 1 | 1 | 1 | 1 | 1 | 0 | 0 |   |   | 1 | 1 | 2 |
| 1 | 1 | 1 | 1 | 1 | 0 | 1 | 1 |   | 1 | 2 | 4 |
| 1 | 1 | 1 | 1 | 1 | 1 | 0 |   | 1 | 1 | 1 | 2 |
| 1 | 1 | 1 | 1 | 1 | 1 | 1 | 1 | 1 | 1 | 3 | 6 |

When this truth table is arranged for Carry7 and Round7, the following table is obtained.

| a6 | a5 | a4 | a3 | a2 | a1 | a0 | Total | Carry7 | Round7 |
|----|----|----|----|----|----|----|-------|--------|--------|
| 0 | 0 | 0 | 0 | 0 | 0 | 0 |   |   |   |
| 0 | 0 | 0 | 0 | 0 | 0 | 1 |   |   |   |
| 0 | 0 | 0 | 0 | 0 | 1 | 0 |   |   |   |
| 0 | 0 | 0 | 0 | 0 | 1 | 1 |   |   |   |
| 0 | 0 | 0 | 0 | 1 | 0 | 0 |   |   |   |
| 0 | 0 | 0 | 0 | 1 | 0 | 1 |   |   |   |
| 0 | 0 | 0 | 0 | 1 | 1 | 0 |   |   |   |
| 0 | 0 | 0 | 0 | 1 | 1 | 1 |   |   |   |
| 0 | 0 | 0 | 1 | 0 | 0 | 0 |   |   |   |
| 0 | 0 | 0 | 1 | 0 | 0 | 1 |   |   |   |
| 0 | 0 | 0 | 1 | 0 | 1 | 0 |   |   |   |
| 0 | 0 | 0 | 1 | 0 | 1 | 1 |   |   |   |
| 0 | 0 | 0 | 1 | 1 | 0 | 0 | 1 |   | 1 |
| 0 | 0 | 0 | 1 | 1 | 0 | 1 | 1 |   | 1 |
| 0 | 0 | 0 | 1 | 1 | 1 | 0 | 1 |   | 1 |
| 0 | 0 | 0 | 1 | 1 | 1 | 1 | 1 |   | 1 |
| 0 | 0 | 1 | 0 | 0 | 0 | 0 |   |   |   |
| 0 | 0 | 1 | 0 | 0 | 0 | 1 |   |   |   |
| 0 | 0 | 1 | 0 | 0 | 1 | 0 |   |   |   |
| 0 | 0 | 1 | 0 | 0 | 1 | 1 |   |   |   |
| 0 | 0 | 1 | 0 | 1 | 0 | 0 | 1 |   | 1 |
| 0 | 0 | 1 | 0 | 1 | 0 | 1 | 1 |   | 1 |
| 0 | 0 | 1 | 0 | 1 | 1 | 0 | 1 |   | 1 |
| 0 | 0 | 1 | 0 | 1 | 1 | 1 | 2 | 1 |   |
| 0 | 0 | 1 | 1 | 0 | 0 | 0 |   |   |   |
| 0 | 0 | 1 | 1 | 0 | 0 | 1 |   |   |   |
| 0 | 0 | 1 | 1 | 0 | 1 | 0 | 1 |   | 1 |
| 0 | 0 | 1 | 1 | 0 | 1 | 1 | 1 |   | 1 |
| 0 | 0 | 1 | 1 | 1 | 0 | 0 | 2 | 1 |   |
| 0 | 0 | 1 | 1 | 1 | 0 | 1 | 2 | 1 |   |
| 0 | 0 | 1 | 1 | 1 | 1 | 0 | 3 | 1 | 1 |
| 0 | 0 | 1 | 1 | 1 | 1 | 1 | 3 | 1 | 1 |
| 0 | 1 | 0 | 0 | 0 | 0 | 0 |   |   |   |
| 0 | 1 | 0 | 0 | 0 | 0 | 1 |   |   |   |
| 0 | 1 | 0 | 0 | 0 | 1 | 0 | 1 |   | 1 |
| 0 | 1 | 0 | 0 | 0 | 1 | 1 | 1 |   | 1 |
| 0 | 1 | 0 | 0 | 1 | 0 | 0 |   |   |   |
| 0 | 1 | 0 | 0 | 1 | 0 | 1 |   |   |   |
| 0 | 1 | 0 | 0 | 1 | 1 | 0 | 1 |   | 1 |
| 0 | 1 | 0 | 0 | 1 | 1 | 1 | 1 |   | 1 |
| 0 | 1 | 0 | 1 | 0 | 0 | 0 |   |   |   |
| 0 | 1 | 0 | 1 | 0 | 0 | 1 | 1 |   | 1 |
| 0 | 1 | 0 | 1 | 0 | 1 | 0 | 1 |   | 1 |
| 0 | 1 | 0 | 1 | 0 | 1 | 1 | 2 | 1 |   |
| 0 | 1 | 0 | 1 | 1 | 0 | 0 | 1 |   | 1 |
| 0 | 1 | 0 | 1 | 1 | 0 | 1 | 1 |   | 1 |
| 0 | 1 | 0 | 1 | 1 | 1 | 0 | 2 | 1 |   |
| 0 | 1 | 0 | 1 | 1 | 1 | 1 | 2 | 1 |   |
| 0 | 1 | 1 | 0 | 0 | 0 | 0 |   |   |   |
| 0 | 1 | 1 | 0 | 0 | 0 | 1 |   |   |   |
| 0 | 1 | 1 | 0 | 0 | 1 | 0 | 1 |   | 1 |
| 0 | 1 | 1 | 0 | 0 | 1 | 1 | 2 | 1 |   |
| 0 | 1 | 1 | 0 | 1 | 0 | 0 | 1 |   | 1 |
| 0 | 1 | 1 | 0 | 1 | 0 | 1 | 1 |   | 1 |
| 0 | 1 | 1 | 0 | 1 | 1 | 0 | 2 | 1 |   |
| 0 | 1 | 1 | 0 | 1 | 1 | 1 | 3 | 1 | 1 |
| 0 | 1 | 1 | 1 | 0 | 0 | 0 |   |   |   |
| 0 | 1 | 1 | 1 | 0 | 0 | 1 | 1 |   | 1 |
| 0 | 1 | 1 | 1 | 0 | 1 | 0 | 2 | 1 |   |
| 0 | 1 | 1 | 1 | 0 | 1 | 1 | 3 | 1 | 1 |
| 0 | 1 | 1 | 1 | 1 | 0 | 0 | 2 | 1 |   |
| 0 | 1 | 1 | 1 | 1 | 0 | 1 | 3 | 1 | 1 |
| 0 | 1 | 1 | 1 | 1 | 1 | 0 | 4 | 2 |   |
| 0 | 1 | 1 | 1 | 1 | 1 | 1 | 5 | 2 | 1 |
| 1 | 1 | 1 | 1 | 1 | 0 | 1 |   |   | 1 | 2 | 4 |
| 1 | 1 | 1 | 1 | 1 | 1 | 0 |   | 1 | 1 | 2 | 4 |
| 1 | 1 | 1 | 1 | 1 | 1 | 1 | 1 | 1 | 1 | 3 | 6 |

-continued

| a6 | a5 | a4 | a3 | a2 | a1 | a0 | Total | Carry7 | Round7 |
|---|---|---|---|---|---|---|---|---|---|
| 1 | 0 | 0 | 0 | 0 | 0 | 0 |  |  |  |
| 1 | 0 | 0 | 0 | 0 | 0 | 1 | 1 |  | 1 |
| 1 | 0 | 0 | 0 | 0 | 1 | 0 |  |  |  |
| 1 | 0 | 0 | 0 | 0 | 1 | 1 | 1 |  | 1 |
| 1 | 0 | 0 | 0 | 1 | 0 | 0 |  |  |  |
| 1 | 0 | 0 | 0 | 1 | 0 | 1 | 1 |  | 1 |
| 1 | 0 | 0 | 0 | 1 | 1 | 0 |  |  |  |
| 1 | 0 | 0 | 0 | 1 | 1 | 1 | 1 |  | 1 |
| 1 | 0 | 0 | 1 | 0 | 0 | 0 |  |  |  |
| 1 | 0 | 0 | 1 | 0 | 0 | 1 | 1 |  |  |
| 1 | 0 | 0 | 1 | 0 | 1 | 0 |  |  |  |
| 1 | 0 | 0 | 1 | 0 | 1 | 1 | 1 |  | 1 |
| 1 | 0 | 0 | 1 | 1 | 0 | 0 | 1 |  | 1 |
| 1 | 0 | 0 | 1 | 1 | 0 | 1 | 2 | 1 |  |
| 1 | 0 | 0 | 1 | 1 | 1 | 0 | 1 |  | 1 |
| 1 | 0 | 0 | 1 | 1 | 1 | 1 | 2 | 1 |  |
| 1 | 0 | 1 | 0 | 0 | 0 | 0 |  |  |  |
| 1 | 0 | 1 | 0 | 0 | 0 | 1 | 1 |  | 1 |
| 1 | 0 | 1 | 0 | 0 | 1 | 0 |  |  |  |
| 1 | 0 | 1 | 0 | 0 | 1 | 1 | 1 |  | 1 |
| 1 | 0 | 1 | 0 | 1 | 0 | 0 | 1 |  |  |
| 1 | 0 | 1 | 0 | 1 | 0 | 1 | 2 | 1 |  |
| 1 | 0 | 1 | 0 | 1 | 1 | 0 | 1 |  | 1 |
| 1 | 0 | 1 | 0 | 1 | 1 | 1 | 3 | 1 | 1 |
| 1 | 0 | 1 | 1 | 0 | 0 | 0 |  |  |  |
| 1 | 0 | 1 | 1 | 0 | 0 | 1 | 1 |  | 1 |
| 1 | 0 | 1 | 1 | 0 | 1 | 0 | 1 |  |  |
| 1 | 0 | 1 | 1 | 0 | 1 | 1 | 2 | 1 |  |
| 1 | 0 | 1 | 1 | 1 | 0 | 0 | 2 | 1 |  |
| 1 | 0 | 1 | 1 | 1 | 0 | 1 | 3 | 1 | 1 |
| 1 | 0 | 1 | 1 | 1 | 1 | 0 | 3 | 1 | 1 |
| 1 | 0 | 1 | 1 | 1 | 1 | 1 | 4 | 2 |  |
| 1 | 1 | 0 | 0 | 0 | 0 | 0 |  |  |  |
| 1 | 1 | 0 | 0 | 0 | 0 | 1 | 1 |  | 1 |
| 1 | 1 | 0 | 0 | 0 | 1 | 0 | 1 |  | 1 |
| 1 | 1 | 0 | 0 | 0 | 1 | 1 | 2 | 1 |  |
| 1 | 1 | 0 | 0 | 1 | 0 | 0 |  |  |  |
| 1 | 1 | 0 | 0 | 1 | 0 | 1 | 1 |  | 1 |
| 1 | 1 | 0 | 0 | 1 | 1 | 0 | 1 |  | 1 |
| 1 | 1 | 0 | 0 | 1 | 1 | 1 | 2 | 1 |  |
| 1 | 1 | 0 | 1 | 0 | 0 | 0 |  |  |  |
| 1 | 1 | 0 | 1 | 0 | 0 | 1 | 2 | 1 |  |
| 1 | 1 | 0 | 1 | 0 | 1 | 0 | 1 |  | 1 |
| 1 | 1 | 0 | 1 | 0 | 1 | 1 | 3 | 1 | 1 |
| 1 | 1 | 0 | 1 | 1 | 0 | 0 | 1 |  | 1 |
| 1 | 1 | 0 | 1 | 1 | 0 | 1 | 2 | 1 |  |
| 1 | 1 | 0 | 1 | 1 | 1 | 0 | 2 | 1 |  |
| 1 | 1 | 0 | 1 | 1 | 1 | 1 | 3 | 1 | 1 |
| 1 | 1 | 1 | 0 | 0 | 0 | 0 |  |  |  |
| 1 | 1 | 1 | 0 | 0 | 0 | 1 | 1 |  | 1 |
| 1 | 1 | 1 | 0 | 0 | 1 | 0 | 1 |  | 1 |
| 1 | 1 | 1 | 0 | 0 | 1 | 1 | 3 | 1 | 1 |
| 1 | 1 | 1 | 0 | 1 | 0 | 0 | 1 |  | 1 |
| 1 | 1 | 1 | 0 | 1 | 0 | 1 | 2 | 1 |  |
| 1 | 1 | 1 | 0 | 1 | 1 | 0 | 2 | 1 |  |
| 1 | 1 | 1 | 0 | 1 | 1 | 1 | 4 | 2 |  |
| 1 | 1 | 1 | 1 | 0 | 0 | 0 |  |  |  |
| 1 | 1 | 1 | 1 | 0 | 0 | 1 | 2 | 1 |  |
| 1 | 1 | 1 | 1 | 0 | 1 | 0 | 2 | 1 |  |
| 1 | 1 | 1 | 1 | 0 | 1 | 1 | 4 | 2 |  |
| 1 | 1 | 1 | 1 | 1 | 0 | 0 | 2 | 1 |  |
| 1 | 1 | 1 | 1 | 1 | 0 | 1 | 4 | 2 |  |
| 1 | 1 | 1 | 1 | 1 | 1 | 0 | 4 | 2 |  |
| 1 | 1 | 1 | 1 | 1 | 1 | 1 | 6 | 3 |  |

When the above table is further arranged for Carry7, the following table is obtained.

| a6 | a5 | a4 | a3 | a2 | a1 | a0 | Carry7 |
|---|---|---|---|---|---|---|---|
| 0 | 0 | 1 | 0 | 1 | 1 | 1 | 1 |
| 0 | 0 | 1 | 1 | 1 | 0 | 0 | 1 |
| 0 | 0 | 1 | 1 | 1 | 0 | 1 | 1 |
| 0 | 0 | 1 | 1 | 1 | 1 | 0 | 1 |
| 0 | 0 | 1 | 1 | 1 | 1 | 1 | 1 |
| 0 | 1 | 0 | 1 | 0 | 1 | 1 | 1 |
| 0 | 1 | 0 | 1 | 1 | 1 | 0 | 1 |
| 0 | 1 | 0 | 1 | 1 | 1 | 1 | 1 |
| 0 | 1 | 1 | 0 | 0 | 1 | 1 | 1 |
| 0 | 1 | 1 | 0 | 1 | 1 | 0 | 1 |
| 0 | 1 | 1 | 0 | 1 | 1 | 1 | 1 |
| 0 | 1 | 1 | 1 | 0 | 0 | 1 | 1 |
| 0 | 1 | 1 | 1 | 0 | 1 | 1 | 1 |
| 0 | 1 | 1 | 1 | 1 | 0 | 0 | 1 |
| 0 | 1 | 1 | 1 | 1 | 0 | 1 | 1 |
| 0 | 1 | 1 | 1 | 1 | 1 | 0 | 2 |
| 0 | 1 | 1 | 1 | 1 | 1 | 1 | 2 |
| 1 | 0 | 0 | 1 | 1 | 0 | 1 | 1 |
| 1 | 0 | 0 | 1 | 1 | 1 | 1 | 1 |
| 1 | 0 | 1 | 0 | 1 | 0 | 1 | 1 |
| 1 | 0 | 1 | 0 | 1 | 1 | 1 | 1 |
| 1 | 0 | 1 | 1 | 0 | 1 | 1 | 1 |
| 1 | 0 | 1 | 1 | 1 | 0 | 0 | 1 |
| 1 | 0 | 1 | 1 | 1 | 0 | 1 | 1 |
| 1 | 0 | 1 | 1 | 1 | 1 | 0 | 1 |
| 1 | 0 | 1 | 1 | 1 | 1 | 1 | 2 |
| 1 | 1 | 0 | 0 | 0 | 1 | 1 | 1 |
| 1 | 1 | 0 | 0 | 1 | 1 | 1 | 1 |
| 1 | 1 | 0 | 1 | 0 | 0 | 1 | 1 |
| 1 | 1 | 0 | 1 | 0 | 1 | 1 | 1 |
| 1 | 1 | 0 | 1 | 1 | 0 | 1 | 1 |
| 1 | 1 | 0 | 1 | 1 | 1 | 0 | 1 |
| 1 | 1 | 0 | 1 | 1 | 1 | 1 | 1 |
| 1 | 1 | 1 | 0 | 0 | 1 | 1 | 1 |
| 1 | 1 | 1 | 0 | 1 | 0 | 1 | 1 |
| 1 | 1 | 1 | 0 | 1 | 1 | 0 | 1 |
| 1 | 1 | 1 | 0 | 1 | 1 | 1 | 2 |
| 1 | 1 | 1 | 1 | 0 | 0 | 1 | 1 |
| 1 | 1 | 1 | 1 | 0 | 1 | 0 | 1 |
| 1 | 1 | 1 | 1 | 0 | 1 | 1 | 2 |
| 1 | 1 | 1 | 1 | 1 | 0 | 0 | 1 |
| 1 | 1 | 1 | 1 | 1 | 0 | 1 | 2 |
| 1 | 1 | 1 | 1 | 1 | 1 | 0 | 2 |
| 1 | 1 | 1 | 1 | 1 | 1 | 1 | 3 |

When this truth table is logically compressed, the following prime implicants for Carry7 are obtained.

| a6 | a5 | a4 | a3 | a2 | a1 | a0 | Carry7 |
|---|---|---|---|---|---|---|---|
| — | — | 1 | 1 | 1 | — | — | 1 |
| — | 1 | 1 | — | 1 | 1 | — | 1 |
| 1 | 1 | — | — | — | 1 | 1 | 1 |
| 1 | — | 1 | — | 1 | — | 1 | 1 |
| — | — | 1 | — | 1 | 1 | 1 | 1 |
| — | 1 | — | 1 | — | 1 | 1 | 1 |
| — | 1 | 1 | — | 1 | 1 | — | 1 |
| — | 1 | 1 | — | — | 1 | 1 | 1 |
| 1 | — | — | 1 | 1 | — | 1 | 1 |
| 1 | — | 1 | 1 | — | 1 | 1 | 1 |
| 1 | 1 | — | 1 | — | — | 1 | 1 |

Figure 8:
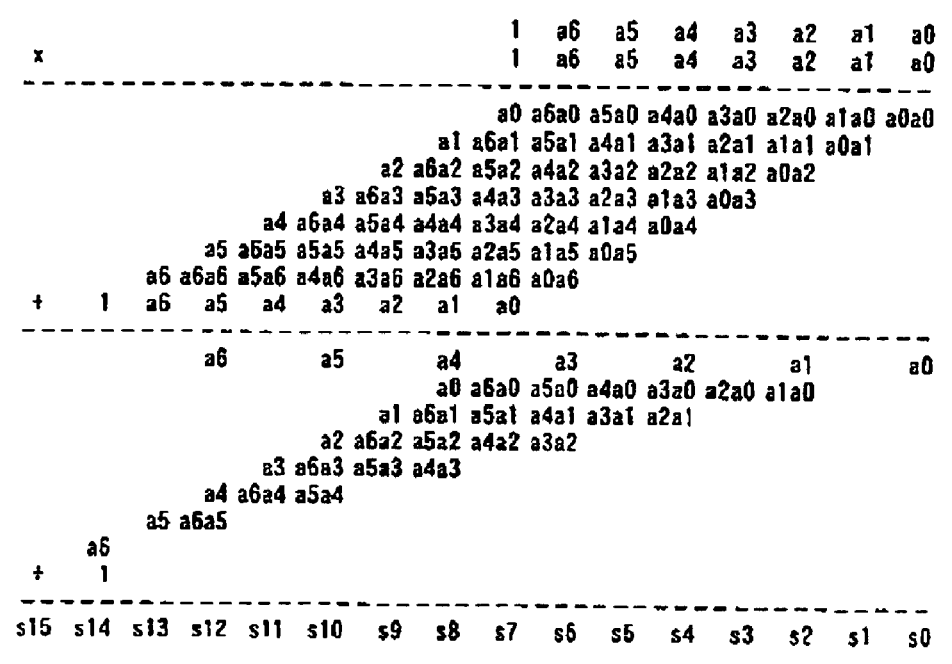

The number of carry signals, and a rounding off signal will now be studied for each of the digits s0 to s7 in FIG. 8.

Figure 2:
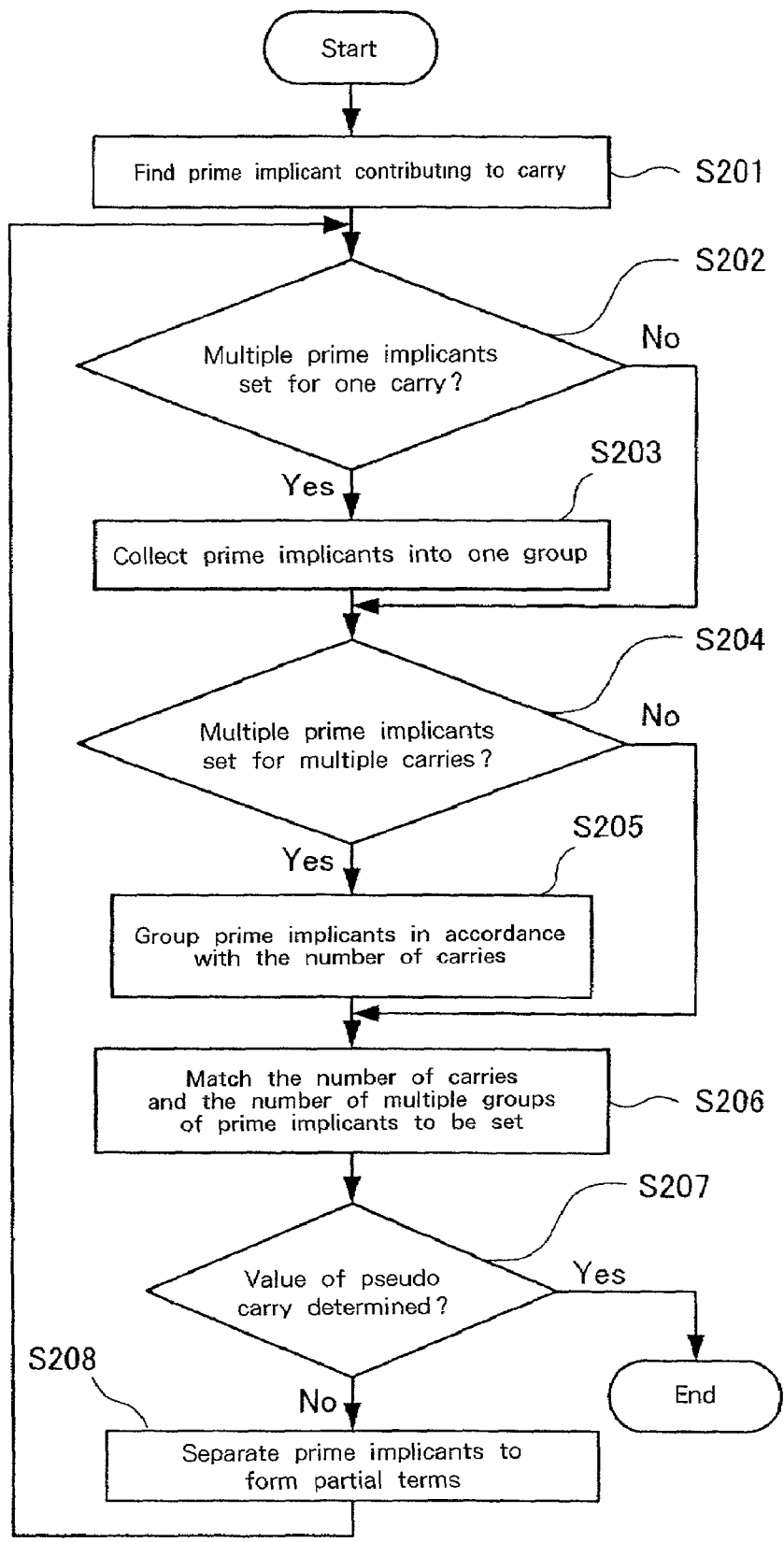
FIG. 2 is a flowchart for explaining a method employed for this embodiment for generating a pseudo carry.

FIG. 2 is a flowchart showing the general method used to obtain the number of carry signals and a rounding off signal, and for generating a pseudo carry.

As is shown in FIG. 2, first, the prime implicants constituting a carry is detected (step 201). Then, a check is performed to determine whether there are multiple prime implicants that are to be set for one carry (step 202). When such multiple prime implicants are present, they are collected into one group (step 203). Thereafter, a further check is performed to determine whether there are multiple prime implicants that are to be set for multiple carries (step 204). When such prime implicants are present, the repetition of the same prime implicant is permitted, and the prime implicants are grouped in accordance with the number of carries (step 205).

Then, a process is performed to match the number of carries with the number of groups of prime implicants that are set (step 206). When one pseudo carry is obtained after the process at step 205 has been completed, the value of the pseudo carry is uniquely determined. But when two pseudo carries are generated, generally a plurality of values, as pseudo carries, are present and if more than three pseudo carries are present, the values of the pseudo carries tend not to be determined and specific sorting is required. For example, for the digits s0 to s7, the number of carries at s0 and s1 is 0, and this case is not applied for the process. Since the number of carries for s2 and s3 is 1, the value of the pseudo carry is uniquely determined. While when the number of carries for s4 is 2, the number of prime implicants matches the number of carries, and the values of the pseudo carries are uniquely determined. The number of carries for s5 is 2, and a plurality of values are available for the pseudo carry. The number of carries for s6 and s7 is 3, and the values of the pseudo carries can not be determined merely by using the prime implicants. In this case, since there are a plurality of values available for the pseudo carries, at step 206 the number of the pluralities of groups of prime implicants that are set is matched by the number of carries, and two pseudo carries are generated.

When the value of a pseudo carry can not be determined during the process performed from step 202 to step 206, an appropriate prime implicant is separated into partial terms, program control returns to step 202 to repeat the following process, and the value of the pseudo carry is determined (steps 207 and 208). In the above example, since the case for s6 is pertinent, the prime implicant is separated into partial terms, and the values of three pseudo carries are determined.

Pseudo carries can be prepared in the above manner. However, as is described above, for bits at position s6 or higher the value available for a pseudo carry is increased and the process required to uniquely determine this value becomes complicated, and it is therefore not realistic to perform a carry look ahead operation. Thus, in this embodiment, when two pseudo carries that are generated at position s5 are defined as f0=Carry5a and f1=Carry5b and the rounding is defined as r5, these carries and the rounding are substituted into the original equations, so that the squaring calculation for the floating-point number is as shown in FIG. 3.

Figure 3:
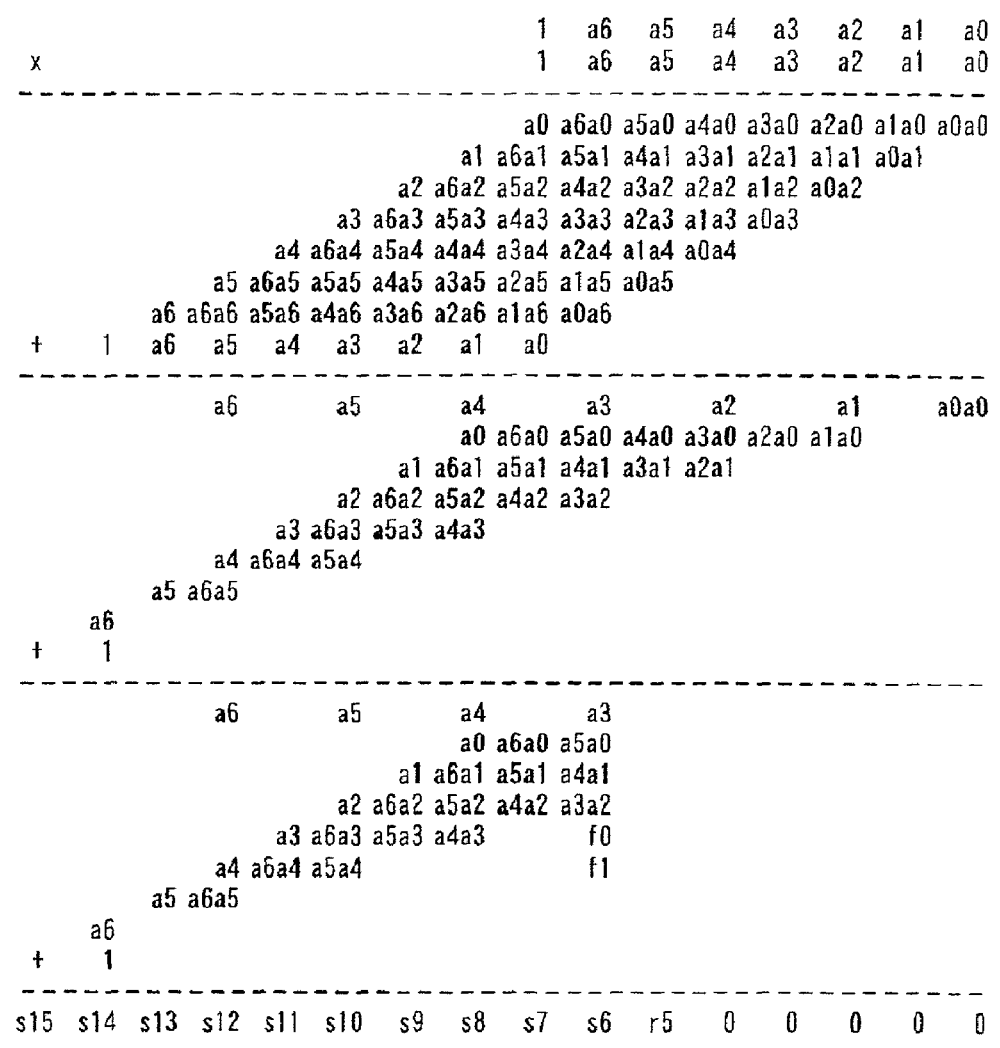

As is shown in FIG. 3, since in this embodiment no calculation is required for the lower six bits, the accumulation of delays in the calculations performed for this portion is removed and the processing speed is increased. Up to position s5 the pseudo carries f0 and f1 can be generated by a two-gate delay (a delay equivalent to two gates), and are input to the Wallace tree for position s6. Whereas the four product terms a3, a5a0, a4a1 and a3a2, which originally are present at position s6, can be generated by a single-gate delay, and therefore, the pseudo carry generator 21a can be implemented at a total cost of only one gate delay.

When the calculation in FIG. 3 is compared with the conventional example in FIG. 8, the number of product terms is reduced from the 36 in FIGS. 8 to 29, and the circuit size is also effectively reduced.

Figure 5:
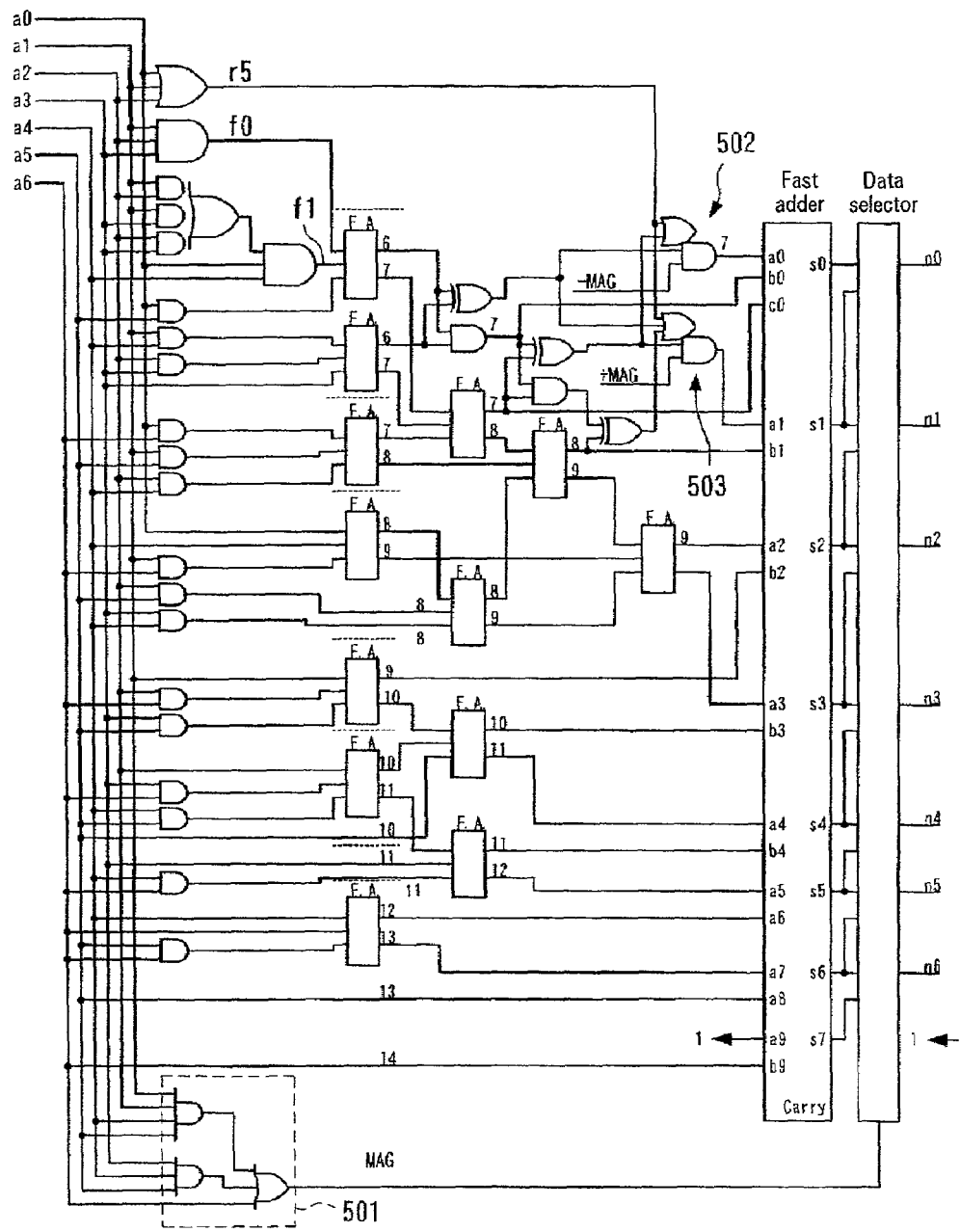
FIG. 5 is a diagram showing the configuration of an 8×8 bits squaring multiplier that according to the embodiment includes a pseudo carry generator and an MSB look ahead circuit.

The actual squaring multiplier is so designed by a CAD that it writes an arithmetic expression in FIG. 3 using a hardware description language such as VHDL or Verilog HDL, and satisfies this expression. FIG. 5 is a diagram showing the configuration of an 8×8 bit squaring multiplier. In FIG. 5, outputs r5, f0 and f1 correspond to the values of r5, f0 and f1 in FIG. 3. Therefore, the combinational circuit of this portion corresponds to the pseudo carry generator 21a, and the calculation performed for the lower six bits is reflected by these outputs.

In this embodiment, the squaring calculation for floating-point numbers is employed. However, the method for performing a carry look ahead operation and increasing the speed at which the floating-point numbers are added can also be employed for another arithmetic operation. That is, according to the method of the invention, when multiple bits are to be added, such as the addition of product terms for multiplication, and when, as a result of the rounding off process, only determinations as to whether a carry is generated and whether a bit of 1 is present are required for several lower bits, regardless of the values of these bits, only information concerning the carry look ahead operation is required and the numerical calculation is eliminated. Therefore, the present invention can be applied for not only squaring calculations, but also for other calculations, such as the multiplication of floating-point numbers, for which the same conditions apply.

In the squaring calculation in this embodiment, i.e., in the squaring calculation for an eight bit floating-point number, the product terms to be added at the higher positions s15, s14, s13 and s12 are constituted only by a6, a5 and a4. Therefore, the calculation of this portion can be simplified.

Since a maximum of two carries are generated at position s11, the following truth table for s12 and Carry12 is obtained while the two carries are defined as Carry11.

| a6 | a5 | a4 | Carry11 | a6 | a4 | a6a5 | s12 | Carry12 |
|----|----|----|---------|----|----|------|-----|---------|
| 0 | 0 | 0 | 0 | 0 | 0 | 0 | 0 | 0 |
| 0 | 0 | 0 | 1 | 0 | 0 | 0 | 1 | 0 |
| 0 | 0 | 0 | 2 | 0 | 0 | 0 | 0 | 1 |
| 0 | 0 | 1 | 0 | 0 | 1 | 0 | 1 | 0 |
| 0 | 0 | 1 | 1 | 0 | 1 | 0 | 0 | 1 |
| 0 | 0 | 1 | 2 | 0 | 1 | 0 | 1 | 1 |
| 0 | 1 | 0 | 0 | 0 | 0 | 0 | 0 | 0 |
| 0 | 1 | 0 | 1 | 0 | 0 | 0 | 1 | 0 |
| 0 | 1 | 0 | 2 | 0 | 0 | 0 | 0 | 1 |
| 0 | 1 | 1 | 0 | 0 | 1 | 0 | 1 | 0 |
| 0 | 1 | 1 | 1 | 0 | 1 | 0 | 0 | 1 |
| 0 | 1 | 1 | 2 | 0 | 1 | 0 | 1 | 1 |
| 1 | 0 | 0 | 0 | 1 | 0 | 0 | 1 | 0 |
| 1 | 0 | 0 | 1 | 1 | 0 | 0 | 0 | 1 |
| 1 | 0 | 0 | 2 | 1 | 0 | 0 | 1 | 1 |
| 1 | 0 | 1 | 0 | 1 | 1 | 0 | 0 | 1 |
| 1 | 0 | 1 | 1 | 1 | 1 | 0 | 1 | 1 |
| 1 | 0 | 1 | 2 | 1 | 1 | 0 | 0 | 2 |
| 1 | 1 | 0 | 0 | 1 | 0 | 1 | 0 | 1 |
| 1 | 1 | 0 | 1 | 1 | 0 | 1 | 1 | 1 |
| 1 | 1 | 0 | 2 | 1 | 0 | 1 | 0 | 2 |
| 1 | 1 | 1 | 0 | 1 | 1 | 1 | 1 | 1 |
| 1 | 1 | 1 | 1 | 1 | 1 | 1 | 0 | 2 |
| 1 | 1 | 1 | 2 | 1 | 1 | 1 | 1 | 2 |

The truth table for s13 and Carry13 is obtained as follows by using the obtained Carry12.

| a6 | a5 | a4 | Carry11 | Carry12 | a5 | s13 | Carry13 |
|----|----|----|---------|---------|----|----|---------|
| 0 | 0 | 0 | 0 | 0 | 0 | 0 | 0 |
| 0 | 0 | 0 | 1 | 0 | 0 | 0 | 0 |

-continued

| a6 | a5 | a4 | Carry11 | Carry12 | a5 | s13 | Carry13 |
|----|----|----|---------|---------|----|-----|---------|
| 0 | 0 | 0 | 2 | 1 | 0 | 1 | 0 |
| 0 | 0 | 1 | 0 | 0 | 0 | 0 | 0 |
| 0 | 0 | 1 | 1 | 1 | 0 | 1 | 0 |
| 0 | 0 | 1 | 2 | 1 | 0 | 1 | 0 |
| 0 | 1 | 0 | 0 | 0 | 1 | 1 | 0 |
| 0 | 1 | 0 | 1 | 0 | 1 | 1 | 0 |
| 0 | 1 | 0 | 2 | 1 | 1 | 0 | 1 |
| 0 | 1 | 1 | 0 | 0 | 1 | 1 | 0 |
| 0 | 1 | 1 | 1 | 1 | 1 | 0 | 1 |
| 0 | 1 | 1 | 2 | 1 | 1 | 0 | 1 |
| 1 | 0 | 0 | 0 | 0 | 0 | 0 | 0 |
| 1 | 0 | 0 | 1 | 1 | 0 | 1 | 0 |
| 1 | 0 | 0 | 2 | 1 | 0 | 1 | 0 |
| 1 | 0 | 1 | 0 | 1 | 0 | 1 | 0 |
| 1 | 0 | 1 | 1 | 1 | 0 | 1 | 1 |
| 1 | 0 | 1 | 2 | 2 | 0 | 0 | 1 |
| 1 | 1 | 0 | 0 | 1 | 1 | 0 | 1 |
| 1 | 1 | 0 | 1 | 1 | 1 | 0 | 1 |
| 1 | 1 | 0 | 2 | 2 | 1 | 1 | 1 |
| 1 | 1 | 1 | 0 | 1 | 1 | 0 | 1 |
| 1 | 1 | 1 | 1 | 2 | 1 | 1 | 1 |
| 1 | 1 | 1 | 2 | 2 | 1 | 1 | 1 |

Further, by using the obtained Carry13, the truth table for s14 and s15 (= Carry14) is obtained as follows:

| a6 | a5 | a4 | Carry11 | Carry13 | a6 | 1 | S14 | S15 |
|----|----|----|---------|---------|----|---|-----|-----|
| 0 | 0 | 0 | 0 | 0 | 0 | 1 | 1 | 0 |
| 0 | 0 | 0 | 1 | 0 | 0 | 1 | 1 | 0 |
| 0 | 0 | 0 | 2 | 0 | 0 | 1 | 1 | 0 |
| 0 | 0 | 1 | 0 | 0 | 0 | 1 | 1 | 0 |
| 0 | 0 | 1 | 1 | 0 | 0 | 1 | 1 | 0 |
| 0 | 0 | 1 | 2 | 0 | 0 | 1 | 1 | 0 |
| 0 | 1 | 0 | 0 | 0 | 0 | 1 | 1 | 0 |
| 0 | 1 | 0 | 1 | 0 | 0 | 1 | 1 | 0 |
| 0 | 1 | 0 | 2 | 1 | 0 | 1 | 0 | 1 |
| 0 | 1 | 1 | 0 | 0 | 0 | 1 | 1 | 0 |
| 0 | 1 | 1 | 1 | 1 | 0 | 1 | 0 | 1 |
| 0 | 1 | 1 | 2 | 1 | 0 | 1 | 0 | 1 |
| 1 | 0 | 0 | 0 | 0 | 1 | 1 | 0 | 1 |
| 1 | 0 | 0 | 1 | 0 | 1 | 1 | 0 | 1 |
| 1 | 0 | 0 | 2 | 0 | 1 | 1 | 0 | 1 |
| 1 | 0 | 1 | 0 | 0 | 1 | 1 | 0 | 1 |
| 1 | 0 | 1 | 1 | 1 | 1 | 1 | 1 | 1 |
| 1 | 0 | 1 | 2 | 1 | 1 | 1 | 1 | 1 |
| 1 | 1 | 0 | 0 | 1 | 1 | 1 | 1 | 1 |
| 1 | 1 | 0 | 1 | 1 | 1 | 1 | 1 | 1 |
| 1 | 1 | 0 | 2 | 1 | 1 | 1 | 1 | 1 |
| 1 | 1 | 1 | 0 | 1 | 1 | 1 | 1 | 1 |
| 1 | 1 | 1 | 1 | 1 | 1 | 1 | 1 | 1 |
| 1 | 1 | 1 | 2 | 1 | 1 | 1 | 1 | 1 |

When s6, s5, s4 and Carry11 are determined by referring to these relationships, all the pseudo carries at positions higher than s12 can be determined. Further, s14 and s15 can be determined by using the pseudo carries. For example, S14 can be obtained by using the following calculation.

S14≦'1' when S(6 downto 5)="00" or S(6 downto 5)="11"

or (S(6 downto 5)="01" and Carry11=0)

or ((S(5 downto 4)="01" or S(5 downto 4)="10" and Carry11=1)

or (S(6=='1' and S(4)='1' Carry11=2)

When Carry11 is determined in the above manner, S12, S13, S14 and S15 can be established by using a two-gate delay. This is faster than when an adder is located in this portion and these bits are determined beginning with the lowest. However, since the higher bit is a portion along the declining slope of the delay of the Wallace tree, various circuit configurations can be employed. For example, the same improvement in the processing speed can be produced by using a two-step carry skip adder.

When, so far as gate delays are concerned, the results provided by the multiplier of this embodiment up until the output for the Wallace tree at s6 is established are compared with those provided by a conventional multiplier, it is found that a seven-gate delay is provided when the ordinary multiplier it is employed for a squaring calculation, and that even when, as is shown in FIG. 8, the number of terms is reduced by using the characteristic of the squaring calculation circuit, a six-gate delay is provided, whereas when a carry look ahead operation is performed using this embodiment, a three-gate delay is provided. Therefore, when the pseudo carry generator 21a of this embodiment is installed in the arithmetic unit 21, the processing speed of the squaring calculation circuit can be considerably increased.

It is logically possible that the pseudo carry generator 21a can be prepared for a higher digit. However, six terms are required for Carry6 to constitute the pseudo carry generator using a combinational circuit, or ten terms are required for Carry10, and as number of digits is increased, the advantage of the pseudo carry generator, i.e., the high speed processing, is gradually reduced. In addition, since not only the prime implicant but also a partial term is required to generate a pseudo carry equal to or higher than Carry7, the calculation time is further increased.

When there are many carries, the method employed by an ordinary arithmetic circuit should be used to handle carries, so as to reduce both circuit size and circuit delays. That is, for higher digits, the results provided by the optimized pseudo carry generator matches those provided by an arithmetic circuit that generates a true carry, and no significant advantage is conveyed by the use of a pseudo carry.

(2) Method for performing a look ahead operation and establishing the MSB in results obtained by adding floating-point numbers, and for performing the rounding off process for the addition results in parallel to the addition During the multiplication of floating-point numbers, a rounding off process is performed for the addition results obtained for mantissas in order to equalize the number of effective bits for input and the number of effective bits for output. In the rounding off process, the location of the MSB of "1" in the addition results must be established to determine, as a round-off bit the digit in the addition results of the floating-point numbers. Therefore, generally, the rounding off process is performed after the floating-point number addition has been completed.

So long as an appropriate combinational circuit (the MSB look ahead circuit 21b) is employed perform a look ahead operation and establish the location of the MSB which has a value of "1", the location of the round-off bit can also be established based on this location. Therefore, the rounding off process can be performed in parallel with to the addition of the floating-point numbers, and the squaring multiplication of the floating-point number can be performed faster.

As preparation of the explanation of the method of the invention for looking ahead and establishing the location of the MSB, an explanation will now be given for the general method used for performing the rounding off process after the addition of floating-point numbers is completed.

Figure 9:
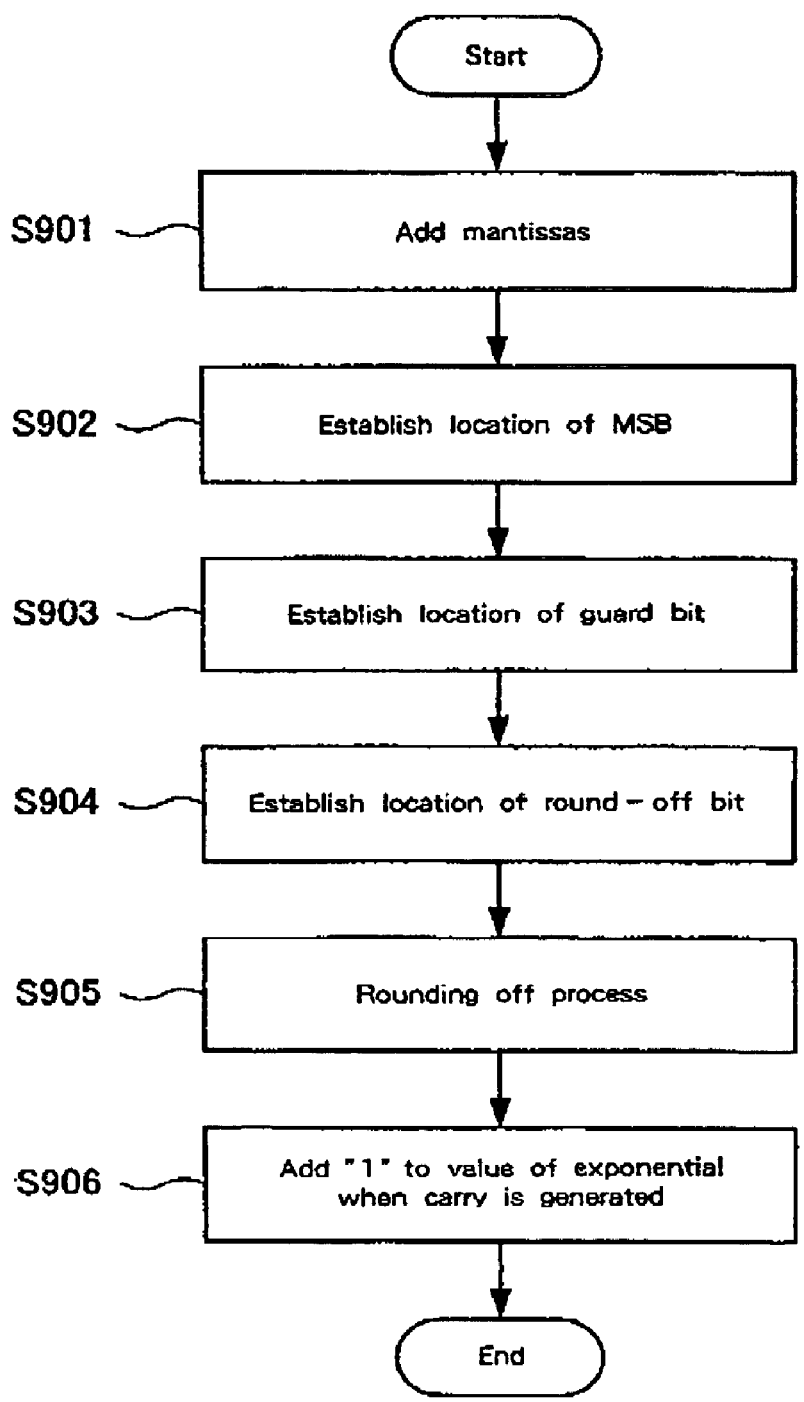
FIG. 9 is a flowchart for explaining the multiplication processing, including the rounding off process.

As previously described for the background art, the multiplication of the floating-point numbers, including the ordinary rounding off process based on standard IEEE 754, is performed as is shown in the flowchart in FIG. 9.

The squaring calculation performed for the floating-point numbers in FIG. 9 will be described by using a specific calculation example.

Figure 4:
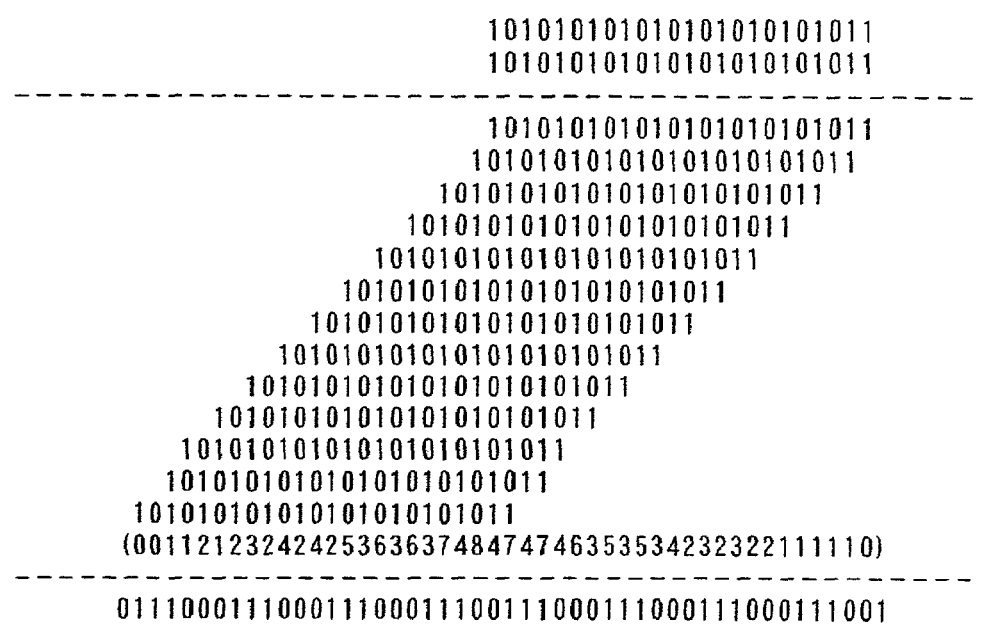

FIG. 4 is a diagram showing the addition results acquired during the squaring calculations performed for 1.01010101010101010101011, which is the binary expression of the numerical value 4/3 (the number of effective digits is 24 bits). Since the MSB is obtained from the addition results in FIG. 4, 0111000111000111000111001110001110001110001111001001 (see step 902 in FIG. 9), 24 bits are extracted from the results, and the 25th bit is defined as a guard bit (see step 903). Then, the next OR is calculated for the remaining bits beginning with the 26th bit, i.e., the lower 22 bits, and the result is defined as the round-off bit (see step 904).

RoundBit='0'when
("1000111000111000111001"="0000000000000000000000")
else '1'

Therefore, for the addition result in FIG. 4, RoundBit='1'.

When the 23rd bit from the lowest, i.e., the guard bit, has a value of "1", and when the round-off bit or the 24th bit from the lowest, i.e., ulp (Unit of Least Precision) has a value of "1", according to standard IEEE 754 the addition result obtained for the ulp bit value and "1" is defined as the rounding off process result (see step 905). For the other cases, the values from the MSB to the 24th bit are defined as the rounding off process result. Since in the addition result in FIG. 4 the values of the 22nd bit, the 23rd bit and the 24th bit are all "1", "1" is added to ulp of the 24th bit from the lowest. Therefore, the result of the rounding off process is

111000111000111000111001+1=111000111000111000111010.

Furthermore, when a carry is generated as a result of the rounding off process and the MSB is shifted, a value of 1 is added to the exponential (see step 906). However, since in the example in FIG. 4 a carry is not generated, this process is not performed.

In this manner, the location of the MSB is detected based on the addition results, and the rounding off is performed along the succeeding process sequence.

A method for performing the look ahead operation for the location of the MSB of "1" will now be described.

During the multiplication of floating-point numbers, the location of the MSB varies depending on whether the multiplication result is equal to or greater than 2. When it is known in advance that the multiplication result is equal to or greater than 2, the look ahead operation can be performed to locate and detect the MSB. Therefore, during the squaring calculation, whether the calculation result is equal to or greater than 2 can be determined by comparing it with the $\sqrt{2}$ ($=2^{1/2}$) the mantissa of the floating-point number to be squared, and the location of the MSB in the calculation results can be established.

A specific explanation will now be given for a 32 bit single precision type and a 64 bit double precision type that are defined by standard IEEE 754.

The value of the $\sqrt{2}$ for the single precision type is $\sqrt{2}$=1.0110 1010 0000 1001 1110 011, and the square thereof is 1.1111 1111 1111 1111 1111 111.

Therefore, when the original number to be calculated is equal to or smaller than the $\sqrt{2}$, the square thereof is equal to or smaller than 2.

Similarly, the value of the $\sqrt{2}$ for the double precision type is $\sqrt{2}$=1.0110 1010 0000 1001 1110 0110 0110 0111 1111 0011 1010 0010 0000 1, and the square thereof is 1.1111 1111 1111 1111 1111 1111 1111 1111 1111 1111 1111 1111 1111 1.

Therefore, when the original number to be calculated is equal to or smaller than the $\sqrt{2}$, the square thereof is equal to or smaller than 2.

As is described above, when both for single precision and double precision the mantissa of the floating-point number to be multiplied is compared with the $\sqrt{2}$, the location of the MSB in the multiplication result can be established. Based on the location of the MSB, the exponential, the ulp, the guard bit and the round-off bit in the multiplication results are established.

Assume that the look ahead operation for the MSB is performed for the squaring calculation of 1.01010101010101010101011, which is the above described binary expression for numerical value 4/3.

When the above described single precision $\sqrt{2}$ having the value 1.0110 1010 0000 1001 1110 011 is compared with 1.01010101010101010101011 (=4/3), the following expression is established.

$4/3 < \sqrt{2}$

Therefore, without performing the addition of the mantissa, it is determined that $(4/3)^2$ is smaller than 2, and the look ahead operation can be performed and the location of the MSB in the multiplication result established.

When the MSB look ahead operation is employed for the squaring calculation of the floating-point number, the rounding off process is performed in parallel with the addition of the mantissa.

That is, during the addition of the mantissas, the product terms are generated for the individual terms of the mantissas and the Wallace tree is employed for the obtained product terms, and the binary adder performs the addition. During this process, the MSB look ahead circuit 21b compares the mantissa with the $\sqrt{2}$, and employs the comparison result to establish the location of the MSB, as well as the locations of the ulp, the guard bit and the round-off bit.

When the addition of the mantissas has progressed up to the digit of the round-off bit that is established by the MSB look ahead circuit 21b and the bit value is determined, the round-off bit is established.

Sequentially the addition employed to obtain a bit higher than the mantissa is performed. Since the round-off bit has already been determined, the rounding off process is terminated at the same time as the addition of the mantissas is terminated.

The circuit configuration of the MSB look ahead circuit 21b will now be described by using the squaring multiplier in FIG. 5.

Assuming A=[1 a6 a5 a4 a3 a2 a1 a0], when A>181, $A \times A$=1XXXXXXXXXXXXXXX, and when A<181, $A \times A$=01XXXXXXXXXXXXXX, so that the location of the MSB is shifted. Since the variable range of A is 255>A>128, when A is defined as a floating-point number, only whether [a6 a5 a4 a3 a2 a1 a0]>53 is established need be determined, so that the location of the MSB can be established.

In the squaring multiplier in FIG. 5, a combinational circuit 501 compares the lower seven digits of the floating-point numbers to be calculated with the numerical value 53 (110101 in the binary system). Based on the output (the comparison results), the location of the MSB is determined. That is, the combinational circuit 501 corresponds to the MSB look ahead circuit 21*b*.

When [a6 a5 a4 a3 a2 a1 a0]>53 is established, the effective numbers are [s15 s14 s13 s12 s11 s10 s9 s8], the guard bit is s7, and the round-off bit is the OR of s6 and s0. At this time, when $$p1 = s7 \ \& \ (s8 + (s6 + r5))$$

is added at the digit of s8, the rounding off process is initiated. This process is performed by a combinational circuit 502, which is the rounding off process means of the squaring multiplier in FIG. 5.

Further, when [a6 a5 a4 a3 a2 a1 a0]≦53, the effective numbers are [s14 s13 s12 s11 s10 s9 s8 s7], the guard bit is s6 and the round-off bit is the OR of s5 and s0. At this time, when $$p0 = s6 \ \& \ (s7 + r5)$$

is added to the digit of s7, the rounding off process is initiated. This process is performed by a combinational circuit 503, which is the rounding off process means of the squaring multiplier in FIG. 5.

The above described determination as to whether [a6 a5 a4 a3 a2 a1 a0]>53 is established can be performed satisfactorily quickly, and the calculations for the rounding off process can be performed while the squaring multiplier in FIG. 5 is adding the mantissas of the floating-point numbers.

As is described above, according to the present invention, the rounding off process can be hidden by the addition of the mantissas of the floating-point numbers. That is, since the rounding off process is terminated at the same time as the addition at step 901 in FIG. 9 is completed, the process beginning at step 902 can be eliminated. As a result, the speed of the squaring calculation performed for the floating-point numbers can be increased.

In addition, in this embodiment, while the MSB look ahead circuit 21*b* is included in the arithmetic unit 21, the adder for performing the rounding off process based on the addition results obtained for the mantissas of the floating-point numbers is not required. As a whole, therefore, the number of gates is reduced, and accordingly, the circuit size is also reduced.

As is described above, according to the invention, since the addition of the floating-point numbers (addition of the mantissas) is logically compressed, the number of arithmetic units that constitute the squaring multiplier for the floating-point numbers can be reduced, and the processing speed can be increased.

Further, according to the invention, since the addition of the floating-point numbers and the rounding off process for the addition results are performed in parallel, the processing speed of the squaring multiplier for the floating-point numbers can be increased.

What is claimed is:

1. A processor comprising:
   a register, for holding a predetermined binary variable; and
   an arithmetic unit, for reading a target variable from said register and for performing various arithmetic operations for said target variable,
   wherein said arithmetic unit includes
   a pseudo carry generator, for generating pseudo information concerning a carry in a number equivalent to the predetermined bit count in an arithmetic operation for said target variable, and
   a combinational circuit, for performing an arithmetic operation for said target variable by using said pseudo information concerning a carry that is generated by said pseudo carry generator.

2. The processor according to claim 1, wherein, for a target bit for a rounding off process during an arithmetic operation, said pseudo carry generator generates said pseudo information concerning a carry.

3. A processor comprising:
   a register, for holding a predetermined binary variable; and
   an arithmetic unit, for reading a target variable from said register and for performing various arithmetic operations for said target variable,
   wherein said arithmetic unit includes
   a pseudo carry generator, for performing look ahead operations for generating carries in a number equivalent to a predetermined bit count in an arithmetic operation performed for said target variable, and
   a combinational circuit for using the results obtained by said pseudo carry generator to perform an arithmetic operation for said target variable.

4. A processor comprising:
   a register, for holding a predetermined binary variable; and
   an arithmetic unit, for reading a target variable from said register and for performing various arithmetic operations for said target variable,
   wherein said arithmetic unit includes
   a pseudo carry generator, for generating information concerning a carry when a numerical value is calculated for a value equivalent in number to the lower predetermined bit count for said target variable, and
   a combinational circuit, for calculating a value for a higher bit while taking into account said information concerning said carry.

5. A processor comprising:
   a register, for holding a predetermined binary variable; and
   an arithmetic unit, for reading a target variable from said register and for performing various arithmetic operations for said target variable,
   wherein said arithmetic unit includes
   a first combinational circuit, for obtaining, directly from a target variable, information concerning the location of a round-off bit that is used for a rounding off process performed in conjunction with an arithmetic operation performed for a variable, and
   a second combinational circuit, for performing said arithmetic operation for said target variable while performing said rounding off process using said information concerning said location of said round-off bit that is obtained by said first combinational circuit.

6. The processor according to claim 5, wherein said second combinational circuit performs said arithmetic operation beginning with the lowest digit of said target variable; and wherein, when said second combinational circuit obtains, from said first combinational circuit, said information concerning said location of said round-off bit, and progresses the calculation up to said location of said round-off bit, said second combinational circuit establishes the value of said round-off bit, and performs the calculation for a higher digit while taking into account said value of said round-off bit.

7. A processor comprising:
a register, for holding a predetermined binary variable; and
an arithmetic unit, for reading a target variable from said register and for performing various arithmetic operations for said target variable,
wherein said arithmetic unit includes
an MSB look ahead circuit, for employing said target variable to establish, in a look ahead manner, the location of the most significant bit (MSB) of the operation results, and
a combinational circuit, for performing a rounding off process based on said location of said most significant bit established by said MSB look ahead circuit.

8. A processor comprising:
a register, for holding a predetermined binary variable; and
an arithmetic unit, for reading a target variable from said register and for performing squaring calculation for said target variable,
wherein said arithmetic unit includes
an MSB look ahead circuit, for comparing said target variable with the $\sqrt{2}$ and for employing the comparison results to establish the location of the most significant bit (MSB) of the results obtained for the operation, and
a combinational circuit, for performing a rounding off process based on the location of said most significant bit that is established by said MSB look ahead circuit.

9. A processor comprising:
a register, for holding a predetermined binary variable; and
an arithmetic unit, for reading a target variable from said register and for performing various arithmetic operations for said target variable,
wherein said arithmetic unit includes
a pseudo carry generator, for generating pseudo information concerning a carry in a number equivalent to the predetermined bit count in an arithmetic operation for said target variable, and
an MSB look ahead circuit, for employing said target variable to establish, in a look ahead manner, the location of the most significant bit (MSB) of the results obtained for the operation, and
a combinational circuit, for performing a rounding off process and an arithmetic operation for said target variable by using said pseudo information concerning a carry that is generated by said pseudo carry generator, and based on the location of said most significant bit that is established by said MSB look ahead circuit.

10. An arithmetic unit that multiplies predetermined binary floating-point numbers comprising:
means for reading a target floating-point number from a register for holding floating-point numbers;
means for generating information concerning a carry, equivalent in number to a predetermined bit count, for said target floating-point number; and
means for adding the mantissa of said target floating-point number while taking into account said information concerning a carry.

11. The arithmetic unit according to claim 10, wherein said means for generating said information concerning a carry generates information concerning a carry for a value equivalent in number to a predetermined lower bit count in said mantissa of said target floating-point number; and wherein said means for performing the addition adds the higher bits of said mantissa while taking into account said information concerning a carry.

12. An arithmetic unit that multiples predetermined binary floating-point numbers comprising:
means for reading a target floating-point number from a register for holding floating-point numbers;
means for performing carry look ahead operations in a number equivalent to a predetermined bit count during the multiplication of said target floating-point number; and
means for multiplying said target floating-point number by using the results obtained by said carry look ahead operations.

13. An arithmetic unit that multiplies predetermined binary floating-point numbers comprising:
means for reading a target floating-point number from a register for holding floating-point numbers;
means for obtaining, directly from said target floating-point number, information that is used for a rounding off process performed in conjunction with the multiplication of said target floating-point number; and
means for adding a mantissa of said target floating-point number while performing said rounding off process using said thus obtained information.

14. An arithmetic unit that multiplies predetermined binary floating-point numbers comprising:
means for reading a target floating-point number from a register for holding floating-point numbers; and
means for obtaining, directly from the mantissa of said target floating-point number, the location of the most significant bit (MSB) of the multiplication results obtained for said target floating-point number.

15. An arithmetic unit that performs squaring calculations for predetermined binary floating-point numbers comprising:
means for reading a target floating-point number from a register for holding floating-point numbers; and
means for comparing the mantissa of said target floating-point number with the $\sqrt{2}$, and for, based on the comparison results, establishing the location of the most significant bit (MSB) of the operation results.

16. An arithmetic method, for an arithmetic unit that multiplies predetermined binary floating-point numbers, comprising the steps of:
reading said target floating-point numbers from registers for holding floating-point numbers;
generating, for a value equivalent in number to the predetermined lower bit count for the mantissas of said target floating-point numbers, information concerning a carry generated when a numerical value is calculated; and
calculating the value of a higher bit while taking into account said information concerning said carry.

17. An arithmetic method, for an arithmetic unit that multiplies predetermined binary floating-point numbers, comprising the steps of:
- reading target floating-point numbers from registers for holding floating-point numbers;
- calculating mantissas for said target floating-point numbers beginning with the lowest digits, and detecting the location of a round-off bit that is used for a rounding off process;
- establishing the value of said round-off bit when the calculation progresses are completed up to said location of said round-off bit; and
- calculating a higher digit while taking into account said value of said round-off bit.

* * * * *